US012812300B1

(12) United States Patent
McLennan

(10) Patent No.: US 12,812,300 B1
(45) Date of Patent: Nov. 24, 2026

(54) ADAPTIVE DEEP NEURAL NETWORK SIGNAL ENHANCEMENT

(71) Applicant: Action Streamer, LLC, Cincinnati, OH (US)

(72) Inventor: Christopher S. McLennan, Cincinnati, OH (US)

(73) Assignee: Action Streamer, LLC, Cincinnati, OH (US)

( * ) Notice: Subject to any disclaimer, the term of this patent is extended or adjusted under 35 U.S.C. 154(b) by 7 days.

(21) Appl. No.: 19/556,940

(22) Filed: Mar. 4, 2026

Related U.S. Application Data

(60) Provisional application No. 63/943,267, filed on Dec. 17, 2025.

(51) Int. Cl.
*H04R 1/14* (2006.01)
*G06N 20/00* (2019.01)
*H04R 3/04* (2006.01)

(52) U.S. Cl.
CPC ............... *H04R 3/04* (2013.01); *G06N 20/00* (2019.01); *H04R 1/14* (2013.01)

(58) Field of Classification Search
CPC ............. H04R 3/04; H04R 1/14; G06N 20/00
See application file for complete search history.

(56) References Cited

U.S. PATENT DOCUMENTS 10,511,908 B1 12/2019 Fisher
2008/0270126 A1* 10/2008 Jung ....................... G10L 25/93 704/E21.001
2024/0005944 A1* 1/2024 Baraff .................... G06N 3/045
2026/0080888 A1* 3/2026 Cordourier Maruri ...................... G10L 21/057

FOREIGN PATENT DOCUMENTS

CN 102610236 A 7/2012

OTHER PUBLICATIONS

Bulut, Ahmet E., and Kazuhito Koishida. "Low-latency single channel speech enhancement using u-net convolutional neural networks." ICASSP 2020-2020 IEEE International Conference on Acoustics, Speech and Signal Processing (ICASSP). IEEE, 2020.
Ronneberger, Olaf, Philipp Fischer, and Thomas Brox. "U-net: Convolutional networks for biomedical image segmentation." International Conference on Medical image computing and computer-assisted intervention. Cham: Springer international publishing, 2015.
Fricative: Wikipedia, web site: https://en.wikipedia.org/wiki/Fricative, accessed on Mar. 11, 2026.

(Continued)

*Primary Examiner* — Joseph Saunders, Jr.
(74) *Attorney, Agent, or Firm* — FBT Gibbons LLP

(57) ABSTRACT

Low quality signals captured using constrained devices may be augmented using a multi-tier signal enhancement system. Such a system may include first and second neural networks, a filter, one or more processors, and one or more non-transitory computer readable mediums. In such a system, the one or more non-transitory computer readable mediums may store instructions to, when executed using the one or more processors, select between processing an input signal with the first neural network, the second neural network, or the filter based on available resources.

14 Claims, 14 Drawing Sheets

(56) References Cited

OTHER PUBLICATIONS

Formant: Wikipedia, web site: https://en.wikipedia.org/wiki/Formant, accessed on Mar. 11, 2026.
Linear Predictive Coding (LPC): Wikipedia, web site: https://en.wikipedia.org/wiki/Linear_predictive_coding, accessed on Mar. 11, 2026.
Rise Time: Wikipedia, web site: https://en.wikipedia.org/wiki/Rise_time, accessed on Mar. 11, 2026.
Sibilant: Wikipedia, web site: https://en.wikipedia.org/wiki/Sibilant, accessed on Mar. 11, 2026.
Spectral Centroid: web site: https://en.wikipedia.org/wiki/Spectral_centroid, accessed on Mar. 11, 2026.
Spectral Flux: web site: https://en.wikipedia.org/wiki/Spectral_flux, accessed on Mar. 11, 2026.
Spectral Slope: web site: https://en.wikipedia.org/wiki/Spectral_slope, accessed on Mar. 12, 2026.
Zero-Crossing Rate: web site: https://en.wikipedia.org/wiki/Zero-crossing_rate, accessed on Mar. 11, 2026.

* cited by examiner

ADAPTIVE DEEP NEURAL NETWORK SIGNAL ENHANCEMENT

CROSS REFERENCE TO RELATED APPLICATIONS

This is a non-provisional of, and claims the benefit of, U.S. provisional patent application 63/943,267, filed Dec. 17, 2025 for Adaptive Deep Neural Network Signal Enhancement, the disclosure of which is hereby incorporated by reference in its entirety.

BACKGROUND

Wearables and other types of devices which are constrained in terms of battery life, processing power and/or physical size are instrumental for acquiring a variety of signals. For example, a throat microphone may be used for capturing a speech signal in an environment where spoken language may otherwise be drowned out by ambient noise, either because there are constraints on speech volume or because the environment is particularly noisy. However valuable throat microphones and analogous devices may be, the constraints of such devices may carry over to limiting their signal acquisition capabilities (e.g., spectrally uneven, lacking natural acoustic characteristics such as brightness, etc.). Because this can result in a signal which is structurally different from a normal speech signal (e.g., as may be captured using a standard air microphone), this may result in a signal which features distortions which cannot be addressed by standard denoising technologies, and which may limit the ultimate utility of the wearable devices. Accordingly, there is a need for technology which is capable of enhancing signals captured by devices with limitations which can impact the signals themselves.

SUMMARY

Described herein are devices, systems and methods for enhancing signals captured by limited devices.

In some aspects, the disclosed technology can be used to implement a multi-tier signal enhancement system. Such a system may include first and second neural networks, a filter, one or more processors, and one or more non-transitory computer readable mediums. In such a system, the one or more non-transitory computer readable mediums may store instructions to, when executed using the one or more processors, select between processing an input signal with the first neural network, the second neural network, or the filter based on available resources. In such a system, the first neural network may be trained to, for each signal from a plurality of signals, as input, take a representation of that signal as captured by a first sensor in a first magnitude encoding form; and, as output, provide a representation of that signal as captured by a second sensor in the first magnitude encoding form. Similarly, the second neural network may be trained to, for each signal from the plurality of signals, as input, take a representation of that signal as captured by the first sensor in a second magnitude encoding form; and as output, provide an output provided by the first neural network in response to taking that signal as input. Also, for each signal from the plurality of signals, the filter may be trained to provide an enhanced signal in response to receiving a signal captured by the first sensor as input.

While multiple examples are described herein, still other examples of the described subject matter will become apparent to those skilled in the art from the following detailed description and drawings, which show and describe illustrative examples of disclosed subject matter. As will be realized, the disclosed subject matter is capable of modifications in various aspects, all without departing from the spirit and scope of the described subject matter. Accordingly, the drawings and detailed description are to be regarded as illustrative in nature and not restrictive.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
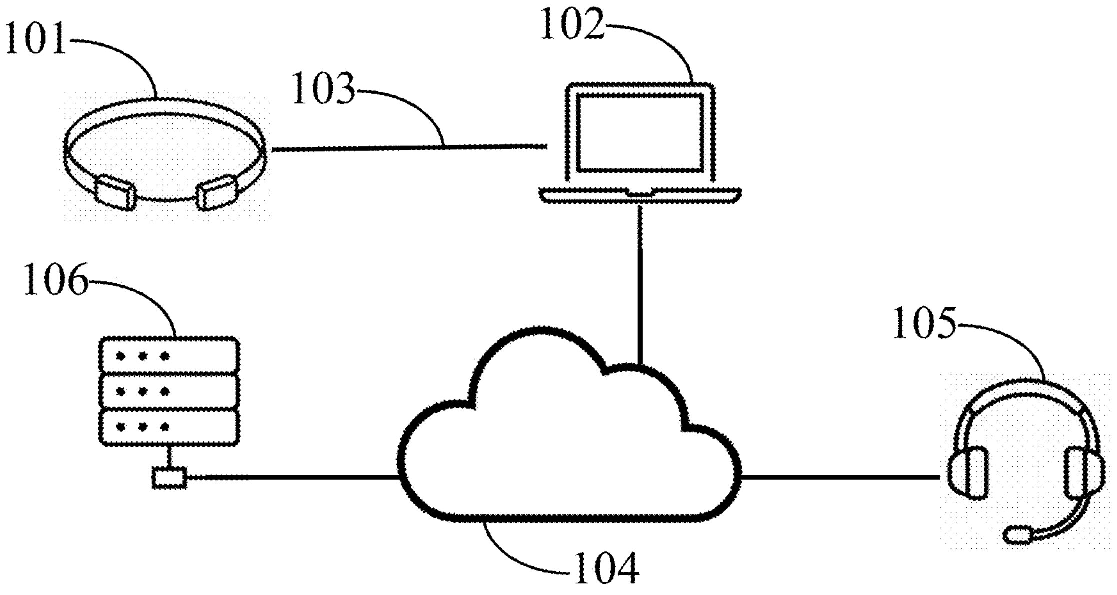
FIG. 1 illustrates a system which could be used to improve audio signals through adaptive processing.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The present disclosure describes systems and methods for enhancing streams captured by devices whose limitations impact the signals themselves. While this description includes particular concrete examples of how such systems and methods may be implemented to enhance speech signals captured by a throat microphone, those examples are intended only to illustrate the disclosed technology, and not to imply limitations on how the disclosed technology may potentially be implemented. For example, the disclosed technology may be applied to other types of contact microphone, such as bone conduction microphones, by those of skill in the art without undue experimentation in light of this disclosure. Accordingly, the protection provided by this document or any other document claiming the benefit of this disclosure should not be limited to the concrete examples described herein, but instead should be defined by the applicable claims which are explicitly defined herein are given their explicit definitions and the other terms are given their broadest reasonable understanding as would be understood from a general purpose dictionary.

Turning now to the figures, FIG. 1 illustrates a system which could be used to improve audio signals through adaptive processing, potentially including processing through one or more deep neural networks. As shown in FIG. 1, such a system may include a throat microphone 101 which may generate an audio signal (e.g., a speech signal) based on vibrations detected while in contact with a user. For example, in some implementations, a throat microphone may include one or more vibration sensors in contact with the skin on a user's neck which would detect vibrations from person's vocal cords and translate them into audio signals for further processing.

In addition to the throat microphone 101, the system illustrated in FIG. 1 also includes a local computer 102 which could receive data from the throat microphone 101 through a local network connection 103 (e.g., Bluetooth connection, IEEE 802.15.4 link, etc.). This local computer 102 may process audio from the throat microphone 101 to generate an improved audio signal which could be sent to various external systems over a wide area network 104. This may be, for example, to an application like a conferencing application which could make the improved audio signal available to other users via various remote audio devices 105. Alternatively, or in addition to making the improved audio signal available to a conferencing application, a local computer 102 may use the wide area network 104 to provide the improved audio signal to a remote server 106, which may perform additional processing on the improved signal, either to provide a higher quality signal to an additional application (e.g., a conferencing application), for archiving, or both.

Figure 2:
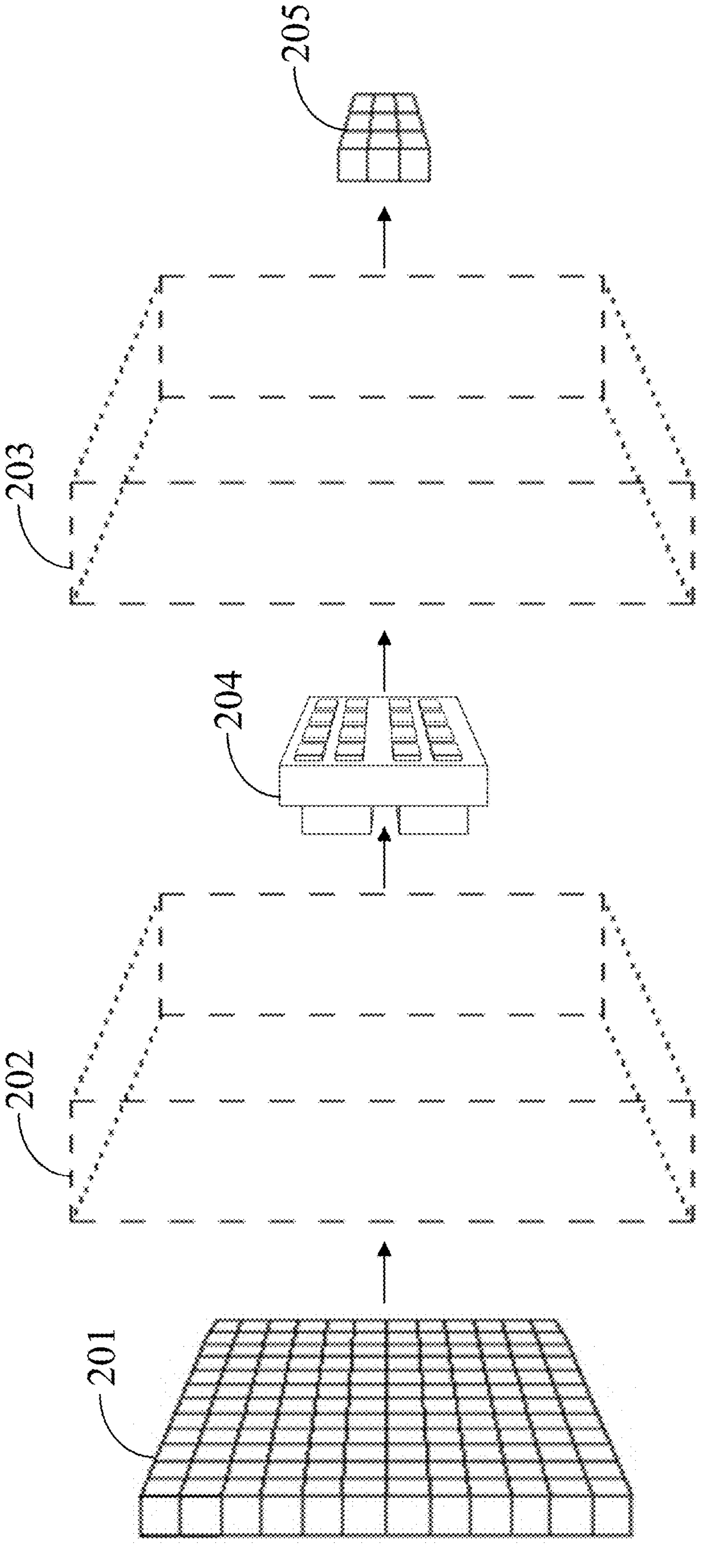
FIG. 2 illustrates an example neural network architecture which may be used for audio signal enhancement.

Turning next to FIG. 2, that figure illustrates an example neural network architecture which may be used (e.g., by a local computer 102 in the system of FIG. 1) to create an improved audio signal based on audio from a throat microphone. In the architecture of FIG. 2, an input representation 201 of the input audio signal would be processed using first and second sets of machine learning stages 202, 203. These sets of stages may be separated by a connector 204, which would transform an output of the first set of stages 202 into a form which could be ingested by the second set of stages, and could be followed by a flattener 205, which could remove any excess depth which may be present after the second set of machine learning stages. In implementations of the disclosed technology, the input representation 201 may be generated, for example, by converting an audio input from a throat microphone into a short time Fourier transform (STFT) log magnitude spectrogram (e.g., 48 kHz audio, N_FFT=2048, hop=0.3 s window, 0.15s/512 frame hop, with Hann window). While being processed, the dimensions of the representation, along with the values in that representation may vary throughout and within the stages in the first and second sets of machine learning stages 202, 203, as well as in the connector 204 and flattener 205. Illustrations of how these stages may be implemented are provided in FIGS. 3, 4A and 4B, and a discussion of how they may modify the dimensions and values of an input 201 are set forth below.

Figure 3:
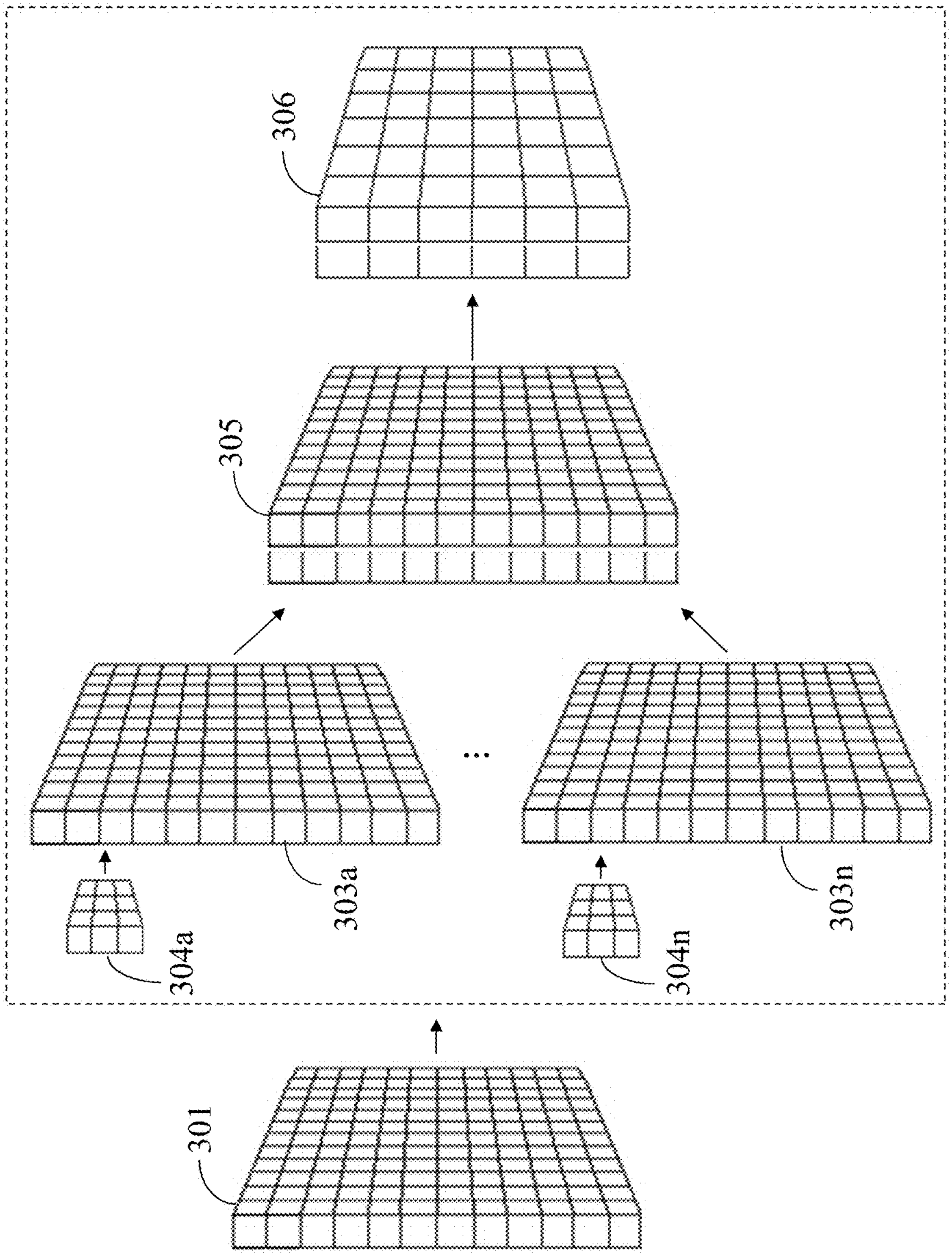
FIG. 3 illustrates a first set of machine learning stages which may be used in the architecture of FIG. 2.

As shown in FIG. 3, in a stage from the first set of machine learning stages 202, a stage input 301 (which, in the initial stage would be the input representation 201 from FIG. 2, and which, in subsequent stages from the first set of machine learning stages 202 would be the output of the preceding stage) would be provided to the stage where it could be processed to generate one or more transformed representations 303*a*-303*n*. This process may include convolving the input 301 with a set of filters 304*a*-304*n* which would extract patterns from the input for inclusion in their respective transformed representations 303*a*-303*n*. This convolution may use filters 304*a*-304*n* which each have a depth equal to the depth of the input 301, and may result in a set of single channel transformed representations 303*a*-303*n*, where there is one corresponding transformed representation for each of the applied filters. These single channel transformed representations 303*a*-303*n* may then be combined into a multi-channel transformed representation 305 by treating each of the single channel transformed representations 303*a*-303*n* as a single channel in the multi-channel representation 305. This multi-channel transformed representation 305 may then be subjected to a pooling operation to generate an output representation 306 for that stage from the first set of machine learning stages. This may be done, for example, by organizing the multi-channel transformed representation 305 into a set of regions on a channel by channel basis, and then, for each channel, replacing the values of that channel's regions with a single value, such as a maximum or average of the values in that region. The result would be a pooled representation whose resolution would be reduced relative to the multi-channel transformed representation 305 based on the size of the regions it was split into (e.g., if the multi-channel transformed representation had dimensions of N×N, and it was split into 2×2 regions, then the pooled representation would have dimensions of (N/2)×(N/2)). This pooled representation could be treated as the output 306 of that stage from the first set of machine learning stages, and then be provided as input to the next stage or, at the final stage in the first set of machine learning stages 202, could be provided to the connector 204.

Figure 4A:
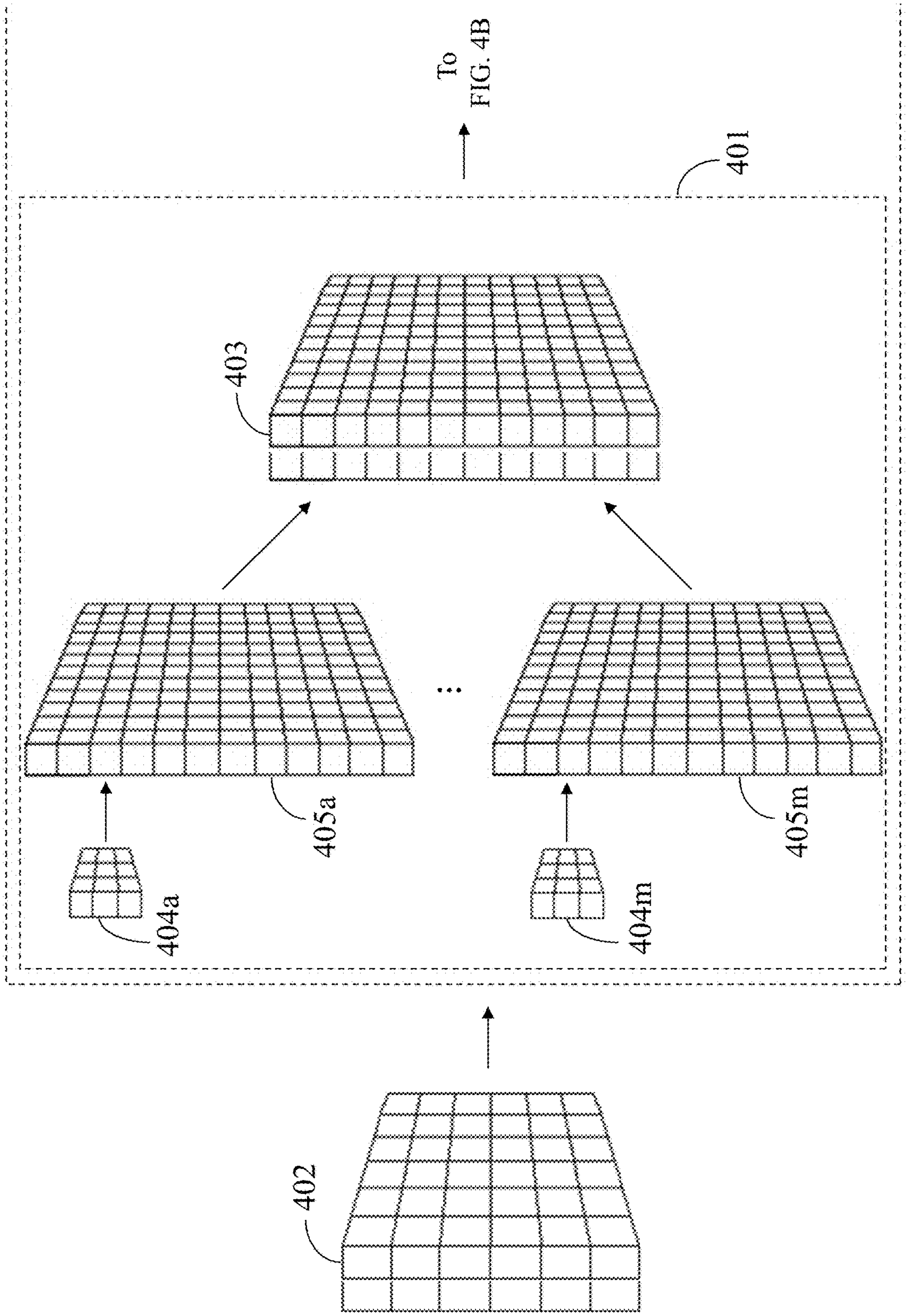
FIGS. 4A-4B illustrate a second set of machine learning stages which may be used in the architecture of FIG. 2.
Figure 4B:
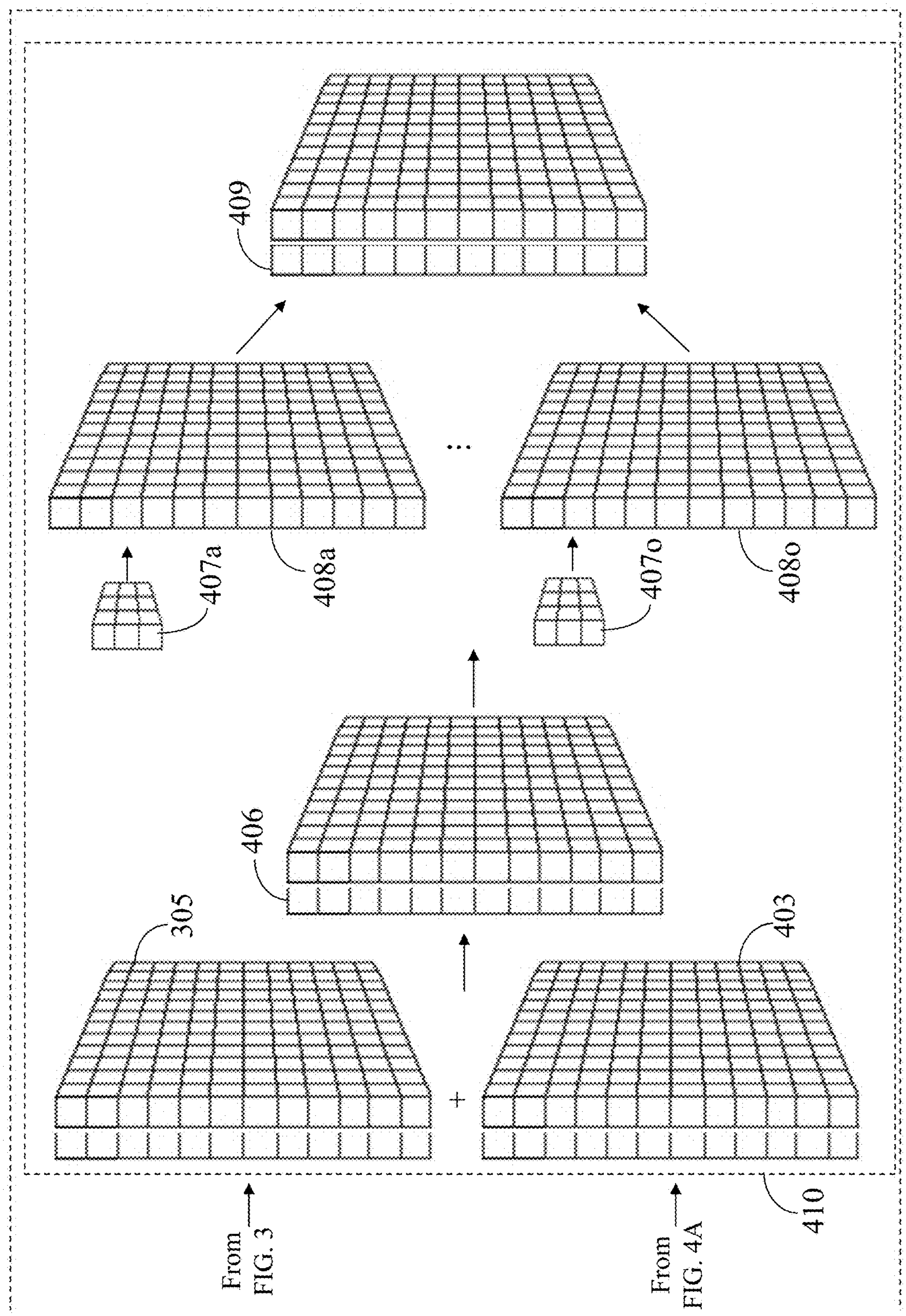

Turning next to the second set of machine learning stages 203, an illustration of a potential implementation of a stage from the second set of stages is provided in FIGS. 4A-4B. As shown in those figures, each stage from the second set of stages can be considered as being made up of two blocks. In a first block 401, illustrated in FIG. 4A, a multi-channel input representation 402 (which, in the first stage from the second set of machine learning stages would be an output 306 of the final stage from the first set of machine learning stages 202 as processed by the connector 204, and in subsequent stages from the second set of machine learning stages 203 would be an output 409 from the preceding stage from the second set of machine learning stages) would be used to create a multi-channel transformed representation 403 which had a higher resolution and a different (e.g., lower) number of channels than the multi-channel input 402. This could include applying a set of transpose convolution filters 404*a*-404*m* to the multi-channel input 402, where each of the transpose convolution filters 404*a*-404*m* had a depth equal to the number of channels in the multi-channel input 402, and provided a corresponding single channel transformed image 405*a*-405*m*. These single-channel transformed representations 405*a*-405*m* could then be combined in a manner similar to that described for the single channel transformed representations 303*a*-303*n* of FIG. 3 to create the multi-channel transformed representation 403, and that representation could then be further processed using a second block 410 as illustrated in FIG. 4B.

As shown in FIG. 4B, in a second block 410 of each stage from the second set of machine learning stages 203, the multi-channel transformed image 403 from the previous block 401 could be combined (e.g., concatenated) with a multi-channel transformed representation 305 from a corresponding stage from a first set of machine learning stages (e.g., the first stage from the second set of machine learning stages could correspond to the last stage from the first set of machine learning stages; the second stage from the second set of machine learning stages could correspond to the second from last stage of the first set of machine learning stages; etc.). This combined representation 406 could then be processed with a set of convolution filters 407*a*-407*o* in a manner similar to that described above for processing an input representation 301 in the context of FIG. 3. More specifically, the combined representation 406 could be convolved with a set of filters 407*a*-4070 which would each provide a corresponding single channel transformed representation 408*a*-4080. Those single channel transformed representations 408*a*-4080 could then be combined (e.g., by treating each of the representations as a single channel) into an output representation 409, would could be provided as input to the next stage or, in the case of the final stage from the second set of machine learning stages, could be provided to the flattener 205.

The processing which takes place in the final two portions of the architecture of FIG. 2—i.e., the connector 204 and the flattener 205—could be similar to the processing described above for the first and second sets of machine learning stages 202, 203. Starting with the connector 204, that component may transform an output from the first set of stages 202 for ingestion by the second set of stages 203 using a set of convolution kernels which would take the output from the last stage of the first set of stages and provide an input having the dimensions (e.g., height, width and number of channels) that the first stage from the second set of machine learning stages 203 was configured to accept. Similarly, the flattener 205 may be implemented as a single convolution filter with a depth equal to the number of channels in the output 409 of the final stage of the second set of machine learning stages 203, so that the result of convolving that filter with the output would be a single channel representation which could function as an enhanced version of the original input representation 201. This could then be converted to an improved audio signal (e.g., through being recombined with the original phase and transformed via inverse short form Fourier transform with overlap-add) which could be provided to various endpoints (e.g., a streaming application, an archiving application) for consumption.

During testing, neural networks following the architecture described above in the context of FIGS. 2-4B were found to be suitable for deriving high quality speech signals from throat microphone audio data despite the structural differences between the two signal types. In particular, the disclosed technology was found to be suitable for extracting air-microphone quality speech from throat microphone signals despite the two types of signals having differences including, but not limited to, those set forth below in table 1.

TABLE 1

Throat microphone and air microphone signals

| | Throat Microphone Signal | Enhanced Signal |
|---|---|---|
| High frequency components | Signal above 5 kHz at or near noise floor. | 3.5-4 kHz signal band is 10-25 dB higher than same band in throat microphone signal. |
| Harmonic balance | Harmonic energy drops off 12-24 dB/octave | Harmonic energy drops off 6-12 db/octave |
| Harmonic to noise ratio | 5-15 dB | 15-20 dB |
| Formants | F3 and F4 formants are reduced in amplitude relative to F1 and F2 formants | F3 and F4 formants have higher amplitude relative to throat microphone signal |
| Mid-low resonances | Elevated power in 200-800 Hz energy band | Lower ratio of 200-800 Hz band energy to 2-4 kHz band energy than throat microphone signal |
| Mechanical coupling artifacts | Increased low frequency (<300 Hz) vibration, subharmonics which don't line up cleanly with vocal fundamental, narrow resonances, motion related vibration bursts | Fewer (or no) mechanical coupling artifacts relative to throat microphone signal |
| Transient behavior | Rise time of 5-15 ms or greater | Rise time in 1-5 ms range; more high frequency bursts and higher zero crossings relative to throat microphone signal. |

While FIGS. 2-4B and the associated text explained how a neural network could be implemented for improving throat microphone audio, it should be understood that that material is illustrative only, and that variations could be implemented by those of skill in the art without undue experimentation based on this disclosure. For example, it is possible that components illustrated in the architecture of FIG. 2 may be implemented in ways which are different from what was described above. For instance, in some implementations, it is possible that a flattener 205 may provide a single value for each location by averaging all channel values at that location, rather than by convolving the channel values with a single convolution filter as described. It is also possible that individual components discussed above in the context of FIGS. 2-4B may be omitted, or that additional components may be added. For example, in some cases a connector 204 which is separate from the first and second sets of machine learning stages 202, 203 may be omitted, and the first stage from the second set of machine learning stages may simply be configured to take the output of the last stage from the first set of machine learning stages directly as input. As another example, it is possible that, after applying the convolution filters 304*a*-304*n* and 407*a*-4070, the single channel transformed representations 303*a*-303*n* and 408*a*-4080 may be subjected to additional processing such as batch normalization and/or rectified linear unit (ReLU) activation. Processing features other than those depicted in the architecture of FIG. 2 (i.e., other than the first and second sets of machine learning stages, the connector and the flattener) may also be implemented in some cases. For example, it is possible that, prior to being provided as input to the first stage in the first set of machine learning stages, a spectrogram of an input audio signal may be subjected to one or more types of preprocessing, such as compression, resolution reduction, or processing with one or more convolution filters. It is also possible that components such as those described in the context of FIGS. 2-4B may be duplicated in some cases. For example, in some implementations of the disclosed technology, in each instance where one of the stages from the first or second set of machine learning stages applies a convolution filter, the application of the convolution filter and related steps (e.g., application of batch normalization and ReLU activation) may be performed multiple times (e.g., twice), thereby increasing the receptive fields of the filters and nonlinearity of the neural network as a whole.

The dimensions of the various stages and components may also vary between implementations of the disclosed technology. For example, table 2 provides a potential implementation of an architecture as described in the context of FIGS. 2-4B which was found to be useful for audio signal enhancement.

TABLE 2

| First exemplary deep neural network |
|---|
| Base channel width: base_ch = 32. |
| First set of machine learning stages: |
| Conv1-1: DoubleConv(1 → 32) |
| Pool1-1: MaxPool2d(2) |
| Conv1-2: DoubleConv(32 → 64) |
| Pool1-2: MaxPool2d(2) |
| Conv1-3: DoubleConv(64 → 128) |
| Pool1-3: MaxPool2d(2) |
| Converter: |
| DoubleConv(128 → 256) |
| Second set of machine learning stages: |
| ConvTranspose2-3: ConvTranspose2d(256 → 128), |
| Conv2-3: DoubleConv(256 → 128) |
| ConvTranspose2-2: ConvTranspose2d(128 → 64) |
| Conv2-2: DoubleConv(128 → 64) |
| ConvTranspose2-1: ConvTranspose2d(64 → 32) |
| Conv2-1: DoubleConv(64 → 32) |
| Flattener: |
| Conv2d(32 → 1) |
| DoubleConv blocks are (Conv2d → BatchNorm2d → ReLU) × 2 with 3×3 kernels and padding=1. |

During testing, a neural network as described in table 2 with the skip connections described above was able to complete the processing of FIG. 1 in 30-40 milliseconds of total processing time using a Geforce RTX 5080 from Nvidia, thereby enabling real time two way audio communication with substantially better sound quality than would be possible using the signal captured directly from the throat microphone hardware.

While the particular dimensions set forth in table 2 have been found to suitable for throat microphone signal enhancement, they are not the only dimensions which may be used for this purpose. An example of a neural network which may be used as an alternative to that of table 2 is provided below in table 3.

TABLE 3

| Second exemplary deep neural network<br>Base channel width: base_ch = 16. Input representation: reduced-resolution log magnitude spectrogram derived from a reduced-point STFT (e.g., 256- or 512-point FFT). |
|---|
| First set of machine learning stages: |
| Conv1-1: DoubleConv(1 → 16) |
| Pool1-1: MaxPool2d(2) |
| Conv1-2: DoubleConv(16 → 32) |
| Pool1-2: MaxPool2d(2) |
| Converter: DoubleConv(32 → 64) |
| Second set of machine learning stages: |
| ConvTranspose2-2: ConvTranspose2d(64 → 32) |
| Conv2-2: DoubleConv(64 → 32) |
| ConvTranspose2-1: ConvTranspose2d(32 → 16) |
| Conv2-1: DoubleConv(32 → 16) |
| Flattener: Conv2d(16 → 1) |

Other types of neural networks, including modified versions of image segmentation networks such as those described in Ronneberger, et. al., *U-Net: Convolutional Networks for Biomedical Image Segmentation. Medical Image Computing and Computer Assisted Intervention*, Munich, 5-9 Oct. 2015, 234-241, available at https://doi.org/10.1007/978-3-319-24574-4_28 (the disclosure of which is hereby incorporated by reference in its entirety), audio transformer networks, multi-layer perceptron networks, may also be used in some implementations for improving throat microphone audio.

In light of the wide variety of potential neural networks which may be used in implementing the disclosed technology, it may be useful to characterize those networks in terms of metrics such as architecture ratios. In this context, an architecture ratio may characterize the dimensional changes applied by a portion of a neural network (e.g., a set of stages). For example, an architecture ratio for a first set of machine learning stages implemented as described in the context of FIGS. 2 and 3 may relate changes in depth and total number of values using a ratio of (a) the cardinality of the output of the last stage from the first set of stages divided by the resolution of the output of the last stage from the first set of stages; to (b) the cardinality of the output of the last stage from the first set of stages divided by the cardinality of the input to the initial stage from the first set of stages. Other types of metrics (e.g., number of layers, relationship of number of layers to architecture ratio, etc.) may also be used for such characterization in various cases.

Figure 5:
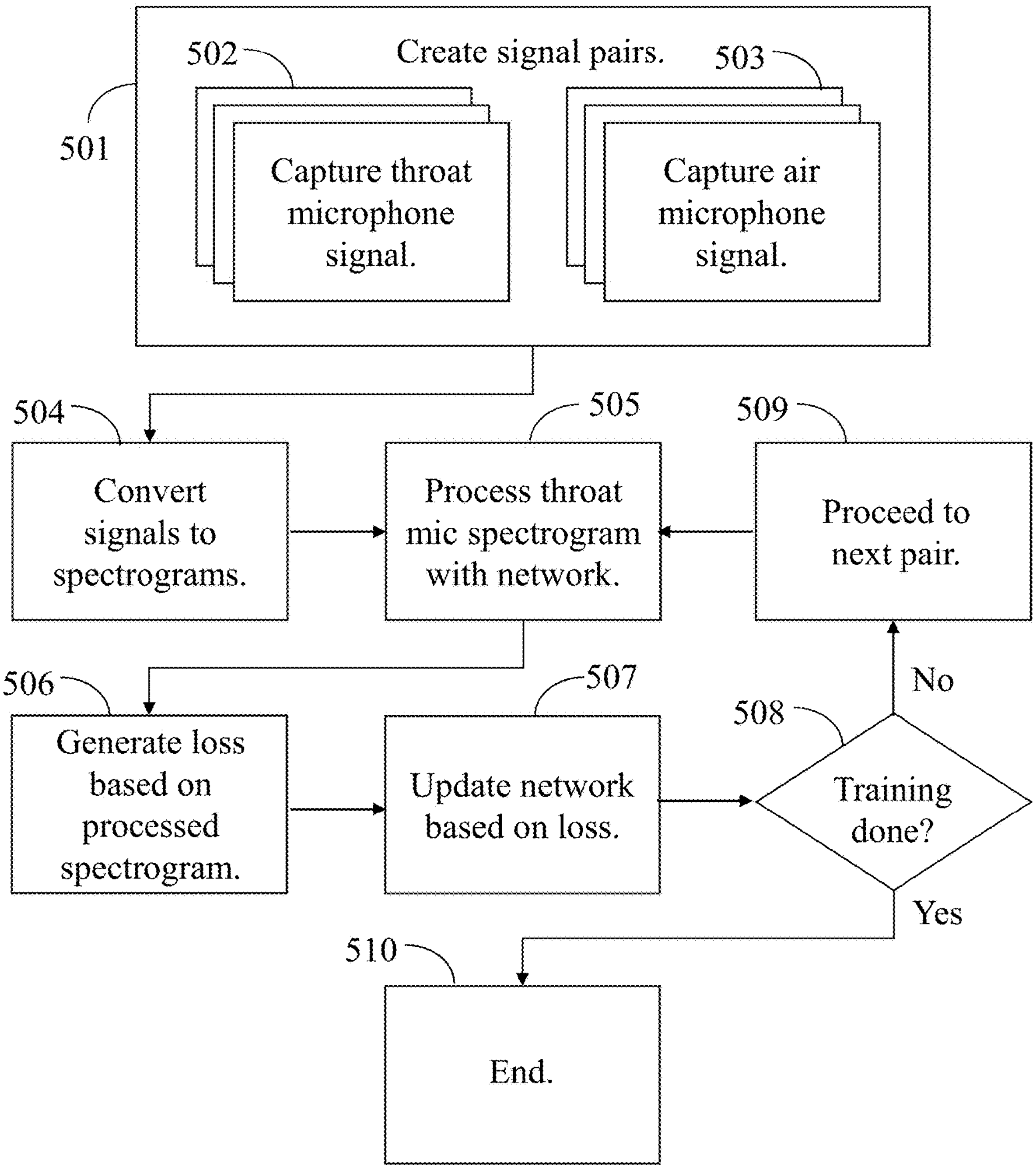
FIG. 5 illustrates a procedure which could be used for training a neural network based on paired signals.

Turning next to FIG. 5, that figure illustrates a procedure which could be used for training a neural network (e.g., a neural network having an architecture such as that illustrated and discussed in the context of FIGS. 2-4B). As shown in that figure, this training may begin with obtaining training data in the form of creating 501 signal pairs. This may include capturing 502 throat microphone signals while a subject is speaking and, simultaneously, capturing 503 signals of the subject's speech with an air microphone (e.g., a microphone in a recording studio). The paired signals may then be converted 504 to spectrograms, such as by transforming the throat microphone and air microphone signals in a pair into paired log magnitude spectrograms via short-time Fourier transform (e.g., 48 kHz audio, 0.3 s window, 0.15 s hop). The network may be configured to transform throat microphone spectrograms into corresponding air microphone spectrograms by initializing its parameters (e.g., the values of filters in a network following the architecture of FIGS. 3-4B) to random values and then using the network (with its then random values) to process 505 the spectrogram created from the throat microphone signal. The resulting processed spectrogram could then be used to generate 506 one or more loss values. For example, each pixel in the processed spectrogram could be compared with the corresponding pixel in the air microphone spectrogram (e.g., upper left pixel in the processed spectrogram compared with upper left pixel in the air microphone spectrogram), and the differences between the values of those pixels could be treated as a pixel-wise loss. This loss could then be used to update 507 the neural network, such as through adjusting the parameter values of the various stages and components via back-propagation. A check 508 may then be performed to determine if the training should be deemed to be complete. This check 508 may be a determination if all training data had been used, or if validation loss had plateaued or begun to increase, though other types of evaluation (e.g., perceptual evaluation of speech quality score or other speech evaluation metric plateaus) may also be used. If the check 508 indicated that training was not complete, then the process could proceed 509 to the next pair and continue until the training was done, at which point the training process could end 510 and the trained network could be used in a system such as illustrated in FIG. 1 for improving audio captured by a throat microphone.

Just as variations are possible in neural network architecture, variations are also possible in the procedure for training a neural network used in implementing the disclosed technology. For example, in some cases where a neural network is trained using spectrograms of simultaneously captured signals, the training may be performed by updating the network on a pair by pair basis. However, it is also possible that the training could include splitting the pairs into multiple subsets, or folds, and then training and evaluating the network multiple times, with a different fold of training pairs being held back as a validation set each time (i.e., K-fold cross validation). In this way, performance metrics from each training instance can be averaged to verify the network's generalization performance and, assuming the performance is acceptable, a final trained version of the network (e.g., whichever trained network had the best individual performance) can be used to make inferences (e.g., for processing throat microphone signals) in production. As another example of a possible variation in how a neural network may be trained in some cases, consider the processing which takes place when converting 504 signals to spectrograms. For instance, while in some cases audio signals may be converted to log magnitude spectrograms using a short time Fourier transform with 48 kHz audio, 0.3 s window and 0.15 s hop, it is also possible that different parameters (e.g., 96 kHz audio, 25 millisecond window, 10 millisecond hop) may be used. It is also possible that different parameters may be used when converting different signals (e.g., 48 kHz for throat microphone, 96 kHz for air microphone), rather than the same set of parameters used for creating both throat microphone and air microphone spectrograms.

As another example of a potential training variation, it is also possible that, rather than training a neural network directly on throat microphone and air microphone spectrograms, a neural network used for improving throat microphone audio may be trained using a different neural network which had previously been trained for that purpose. An overview of this type of training process is provided in FIG. 6. As shown in that figure, using a first neural network to train a second neural network may begin with training 601 the first neural network. This may be done, for example, by training a network such as that described in table 2 to enhance throat microphone audio signals using a procedure such as described in the context of FIG. 5. After the first neural network had been trained 601, a throat microphone waveform which would be used for training a second neural network (e.g., a neural network implemented using the architecture of table 3) could be provided 602 to workflows which would process 603 it using the first neural network and process 604 it with the second neural network. This processing could result in two enhanced spectrograms, and those spectrograms may be used to generate 605 a loss for updating 606 the second neural network. These acts may be performed in a manner similar to that described in the context of FIG. 5 for generating 506 a loss based on a processed spectrogram and updating 507 the network based on that loss, except that, in the process of FIG. 6 the loss would be generated based on the outputs of the two neural networks, with the spectrogram from the first neural network (i.e., the spectrogram from the neural network which was initially trained 601) taking the place of the air microphone spectrogram as ground truth data.

Figure 6:
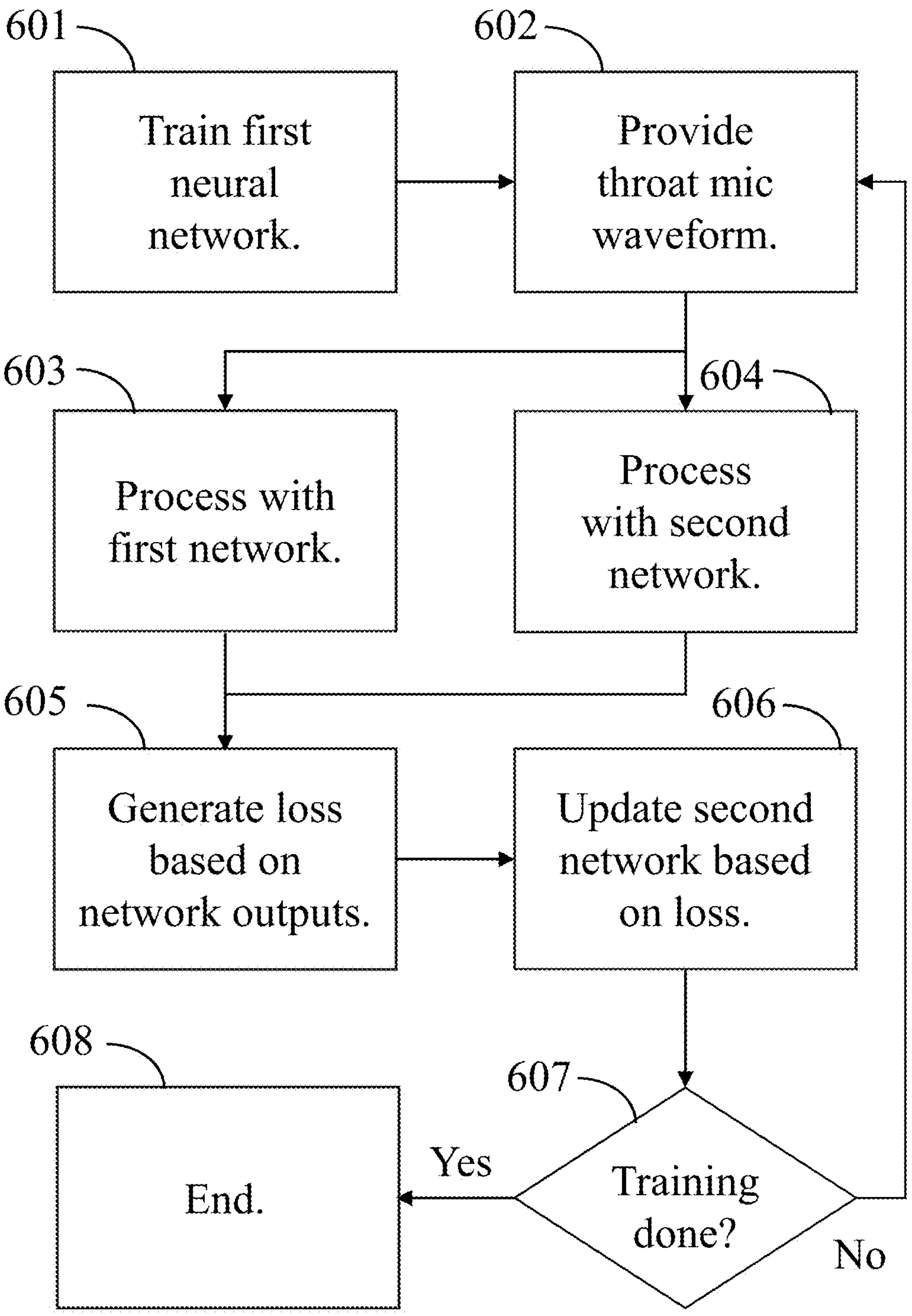
FIG. 6 illustrates a procedure which could be used for training a neural network to emulate a previously trained neural network.

In the method of FIG. 6, after the second network had been updated 606, a check 607 analogous to the check 508 from the method of FIG. 5 could be performed to determine if the process of training the second network should be treated as complete. If it was, process could end 608, and the second neural network could be used in production to improve throat microphone signals using a lightweight model where the full capabilities (and processing requirements) of the original neural network may not be necessary or appropriate. For example, the model training approach described in the context of FIG. 6 could be used to support lightweight model processing which differs in that the lightweight model (i.e., the model which would be trained in the process of FIG. 6) may be provided inputs with a reduced STFT resolution (e.g., reducing a 1024-point FFT with 50% overlap used by the training model to a 256-point or 512-point FFT with reduced overlap, thereby lowering both frequency resolution and computational complexity), and/or may be provided which a compressed spectral representation (e.g., grouping adjacent frequency bins into perceptually motivated bands such as Bark-scale or Mel-scale bands, or applying logarithmic frequency bin pooling to reduce the dimensionality of the magnitude spectrum prior to neural network processing). It is also possible that the lightweight model processing may include tweaking the raw throat microphone waveform with one or more lightweight convolution layers (e.g., one-dimensional convolution layers having small kernel sizes such as 3-7 samples and a limited number of channels, configured to emphasize voicing-related frequency regions and suppress low-frequency mechanical artifacts characteristic of throat microphones) before it would be transformed into a log magnitude representation to be input into the lightweight model. In this way, the training approach of FIG. 6 may provide a neural network which can provide high quality speech enhancement on wearable hardware that may not be able to support a full network such as that illustrated in table 2, thereby enabling near-original network quality processing in real time on a broader variety of embedded platforms.

It should be understood that, while neural network implementations such as described above may be used for audio signal enhancement, neural networks are not the only types of machine learning models which may be used for that purpose. For example, in some cases the disclosed technology may be implemented by offline training of a set of transformations to create a linear (or quasi-linear) spectral transform which could be used to allow for audio enhancement on ultra-limited hardware (e.g., a battery powered wearable with no GPU and limited CPU, or a system where there is an extremely low latency limit). This offline training may include computing mean ratios between studio microphone and throat microphone STFT magnitudes (e.g., ratios of magnitudes from the same types of training data described previously in the context of FIG. 5), and then fitting those ratios onto one or more of a multi-band equalizer (EQ) curve, a compact finite impulse response (FIR) filter bank, or a lookup-table-driven spectral gain function. This offline training can result in a lightweight algorithm that can run on low MIPS-microcontrollers, small DSP blocks, analog-adjacent digital logic, or other ultra-limited devices.

Following offline training, the resulting transformation model could be provided with input from a throat microphone, with the output of the transformation model potentially being further enhanced, such as through the addition of synthetic harmonic excitement. This may be based on principles used in exciter/enhancer audio processors, and may include steps like: (1) detecting approximate fundamental frequency of voice/unvoiced segments; (2) generating missing harmonic content (e.g., $2^{nd}$, $3^{rd}$ or fractional harmonics); (3) mixing the generated harmonics with the linearly filtered throat-microphone audio; and (4) applying soft clipping and/or saturating nonlinearities to emulate natural acoustic brightness. In this way, the disclosed technology may be used to create a high-quality near-studio audio signal from a low quality throat microphone input in real time even when using extremely limited hardware.

Figure 7:
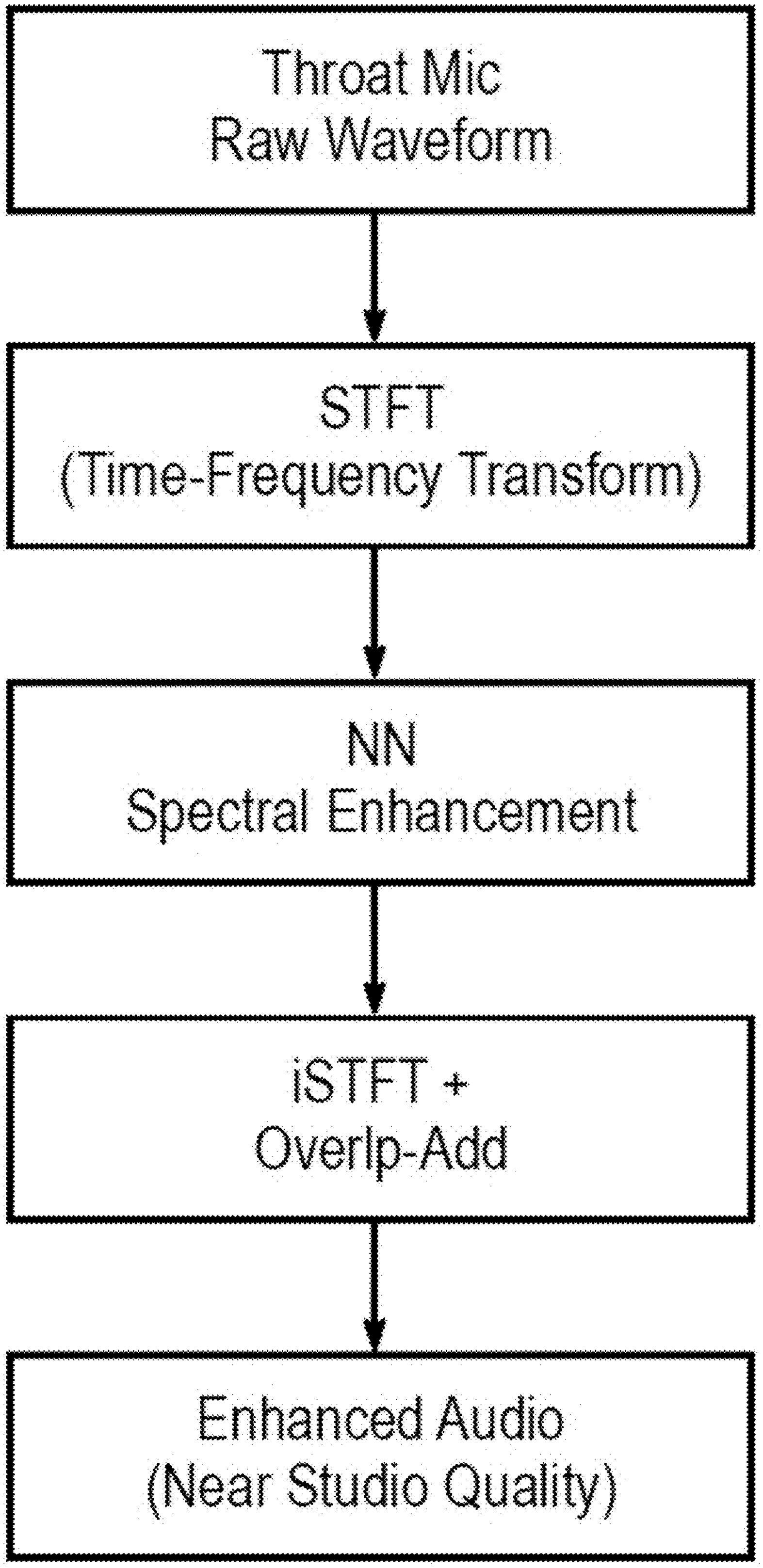
FIG. 7 illustrates a processing pipeline which may be used to improve throat microphone signals through application of a neural network.
Figure 8:
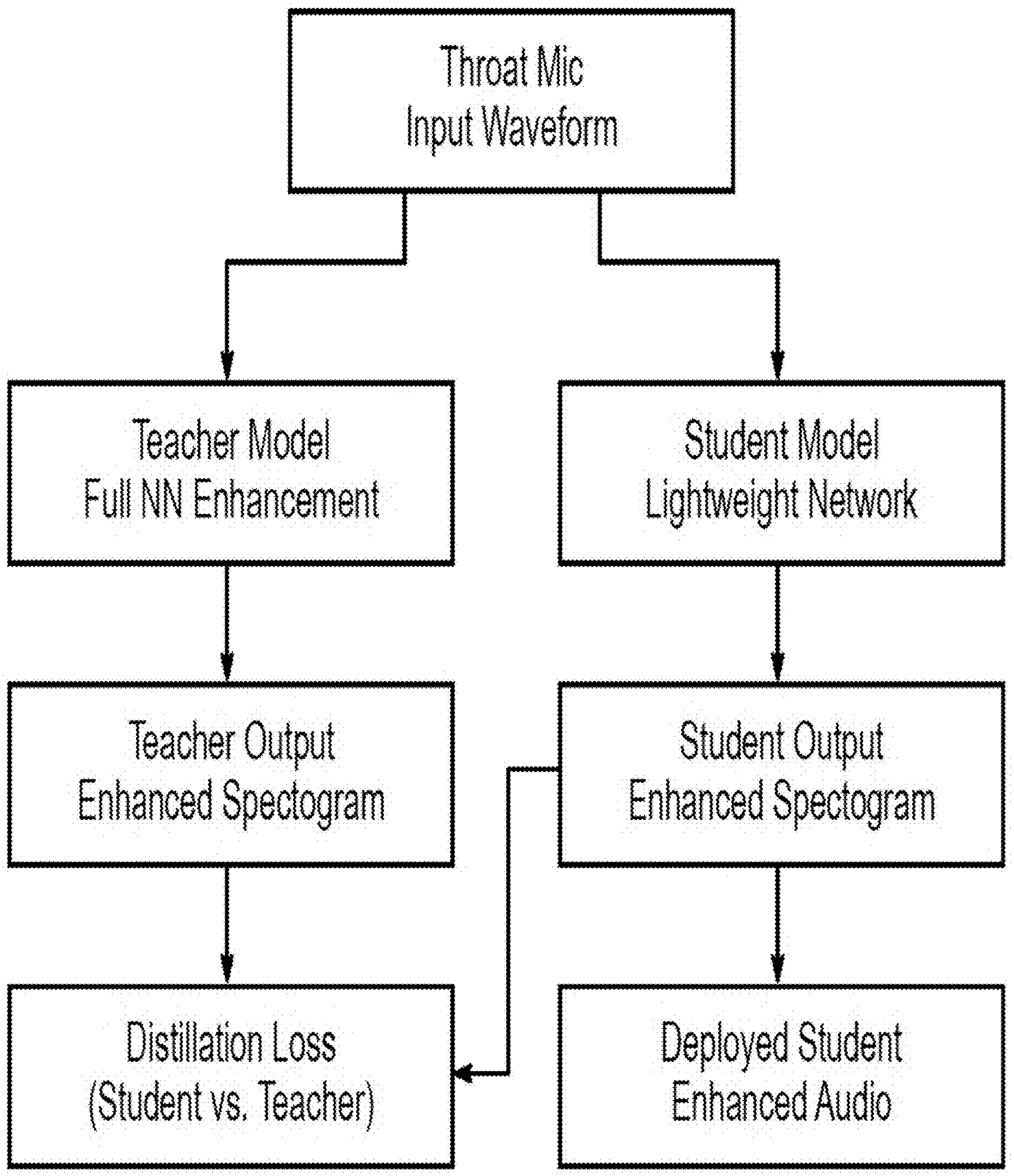
FIG. 8 illustrates a processing pipeline in which one model (a teacher model) is used to train another model (a student model).
Figure 9:
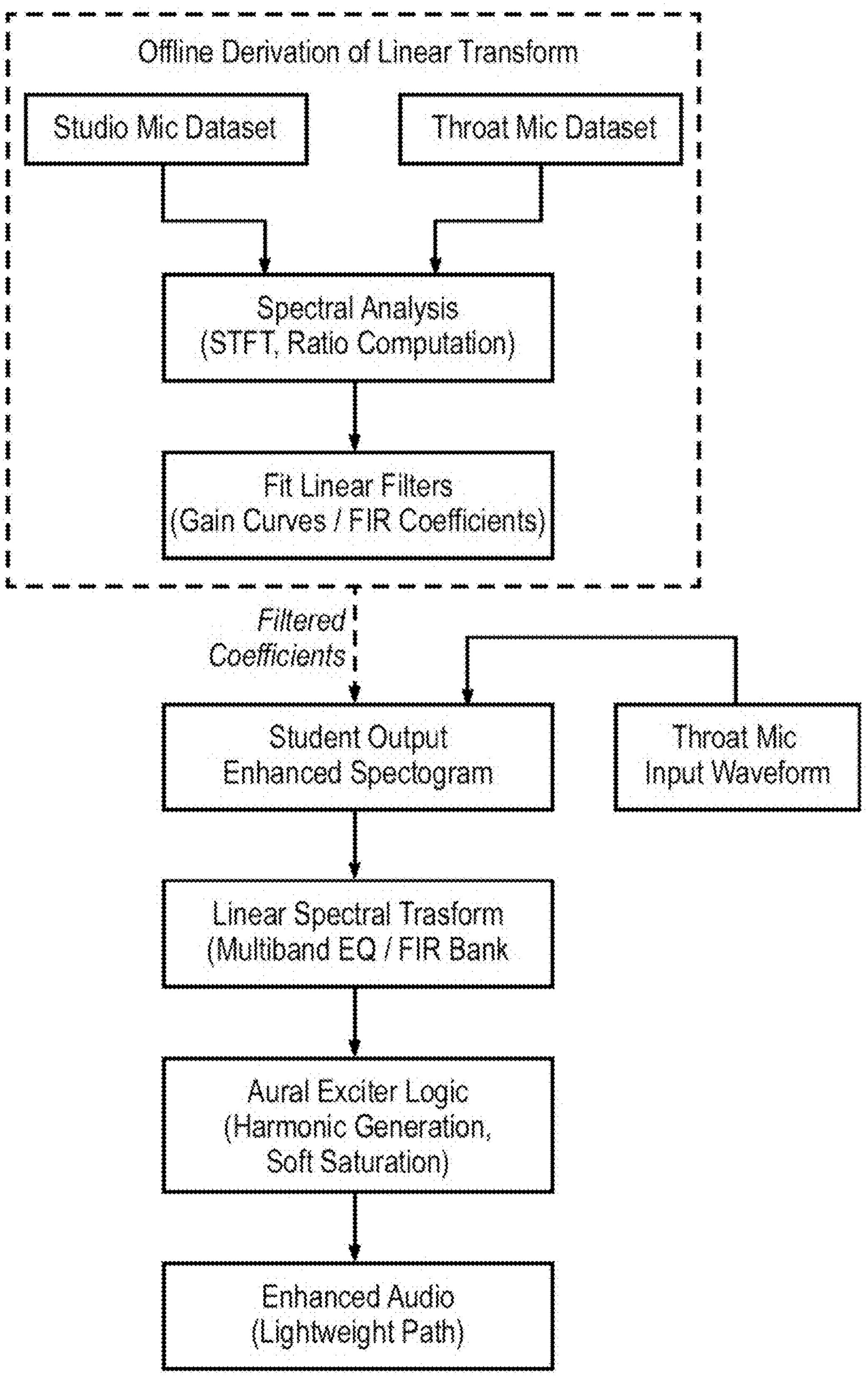
FIG. 9 illustrates a processing pipeline which uses linear transform(s) to provide for signal improvement on ultra-limited hardware.
Figure 10A:
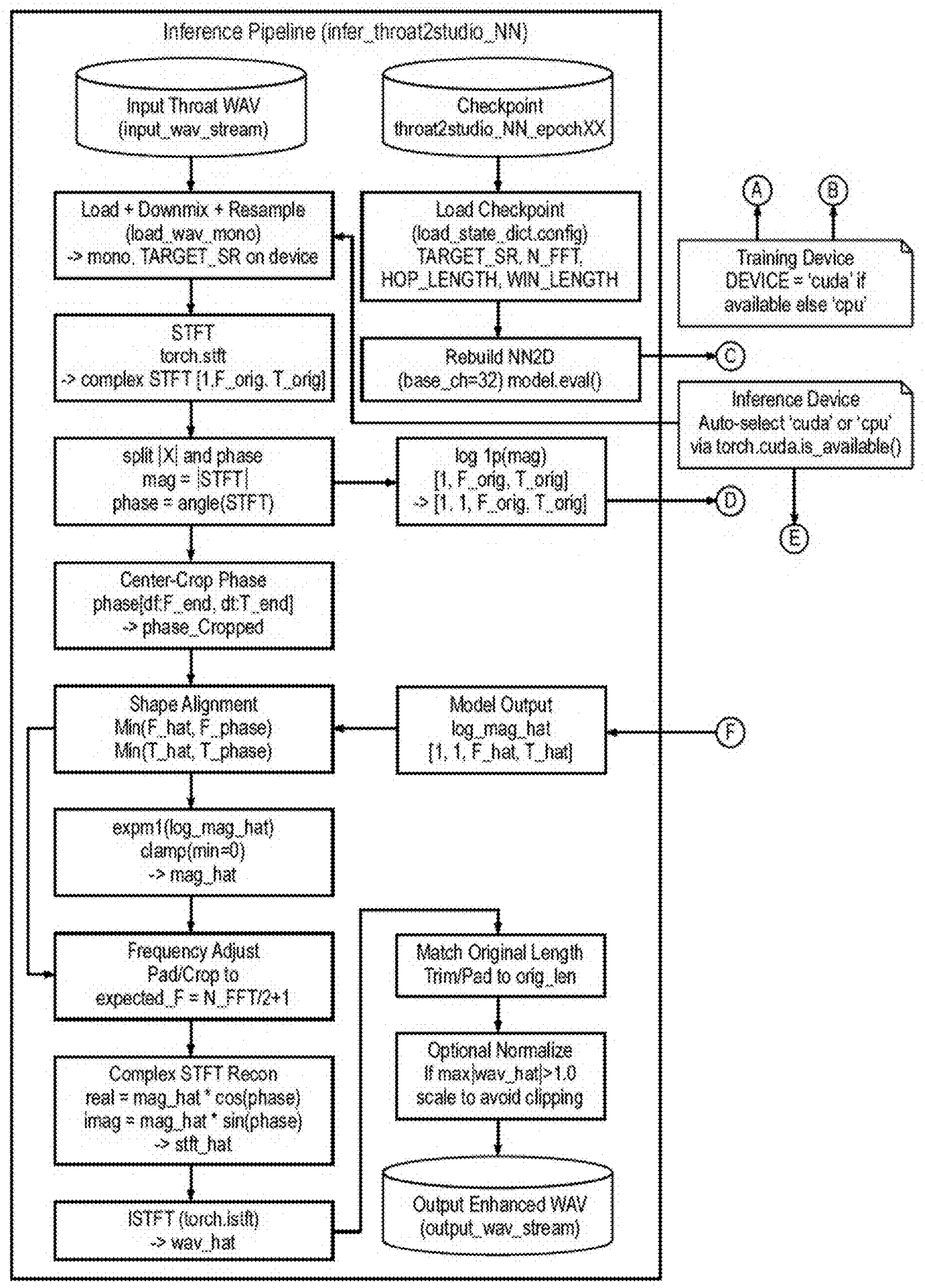
FIGS. 10A-10B illustrate a flowchart including both training and inference pipelines.
Figure 10B:
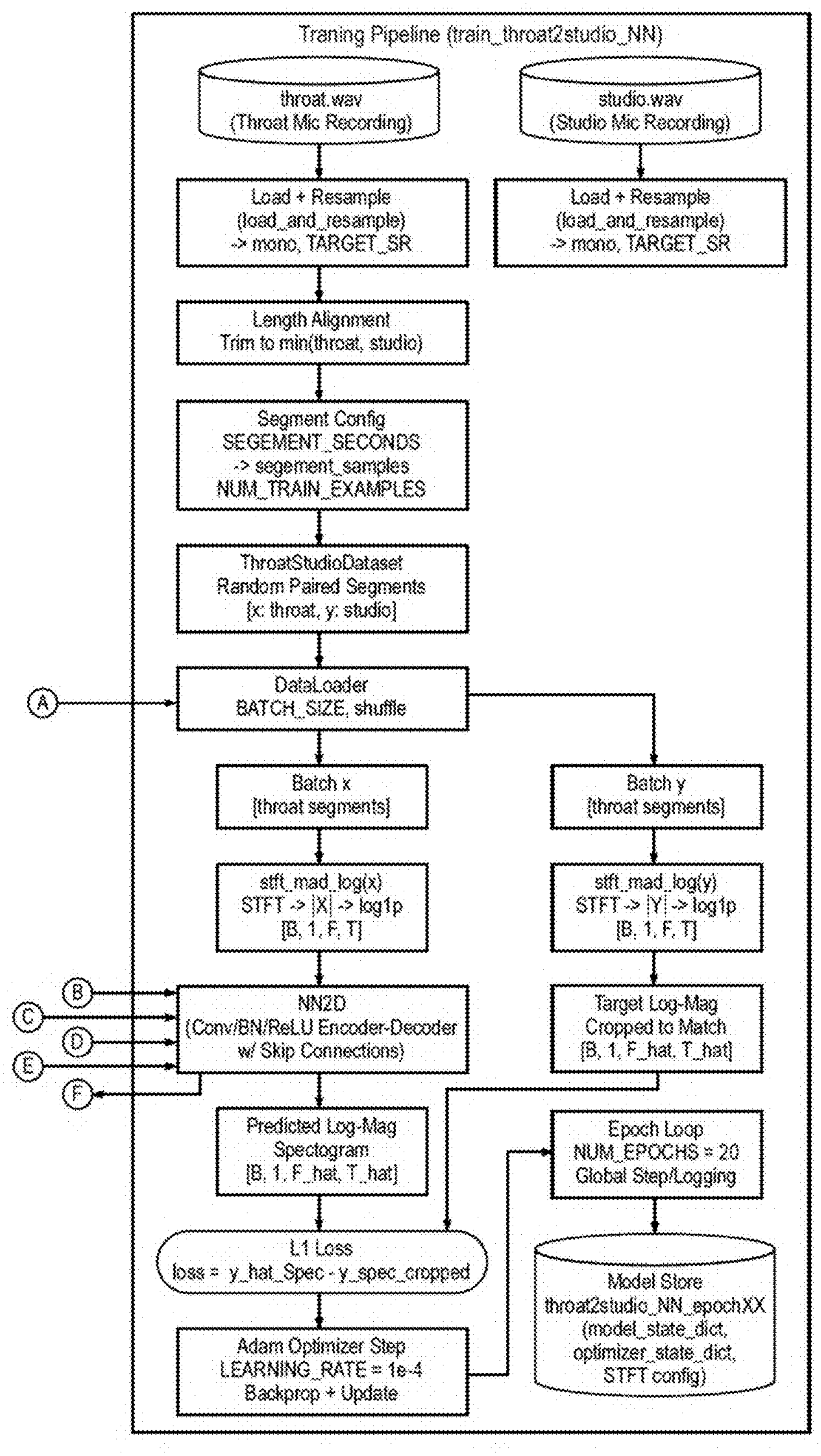

To further illustrate how the disclosed technology may potentially be implemented, FIGS. 7-10B illustrate processing pipelines which may be implemented based on this disclosure. In those figures, FIG. 7 illustrates a processing pipeline which may be used to improve throat microphone signals through application of a neural network (e.g., a network following table 2) trained on spectrograms of pairs of simultaneously captured throat microphone and studio microphone signals. FIG. 8 illustrates a processing pipeline in which one model (a teacher model) is used to train another model (a student model) in a manner as described in the context of FIG. 6, such that the student model can be deployed to provide audio enhancement using reduced processing relative to what would be required through use of the teacher model. FIG. 9 illustrates a processing pipeline which uses linear transform(s) to provide for signal improvement on ultra-limited hardware. FIGS. 10A-10B illustrate a flowchart which includes both training and inference pipelines such as could be used to configure a neural network such as described in the context of FIGS. 2-4B and then use that neural network to provide enhancements to an audio signal in real time.

Figure 11:
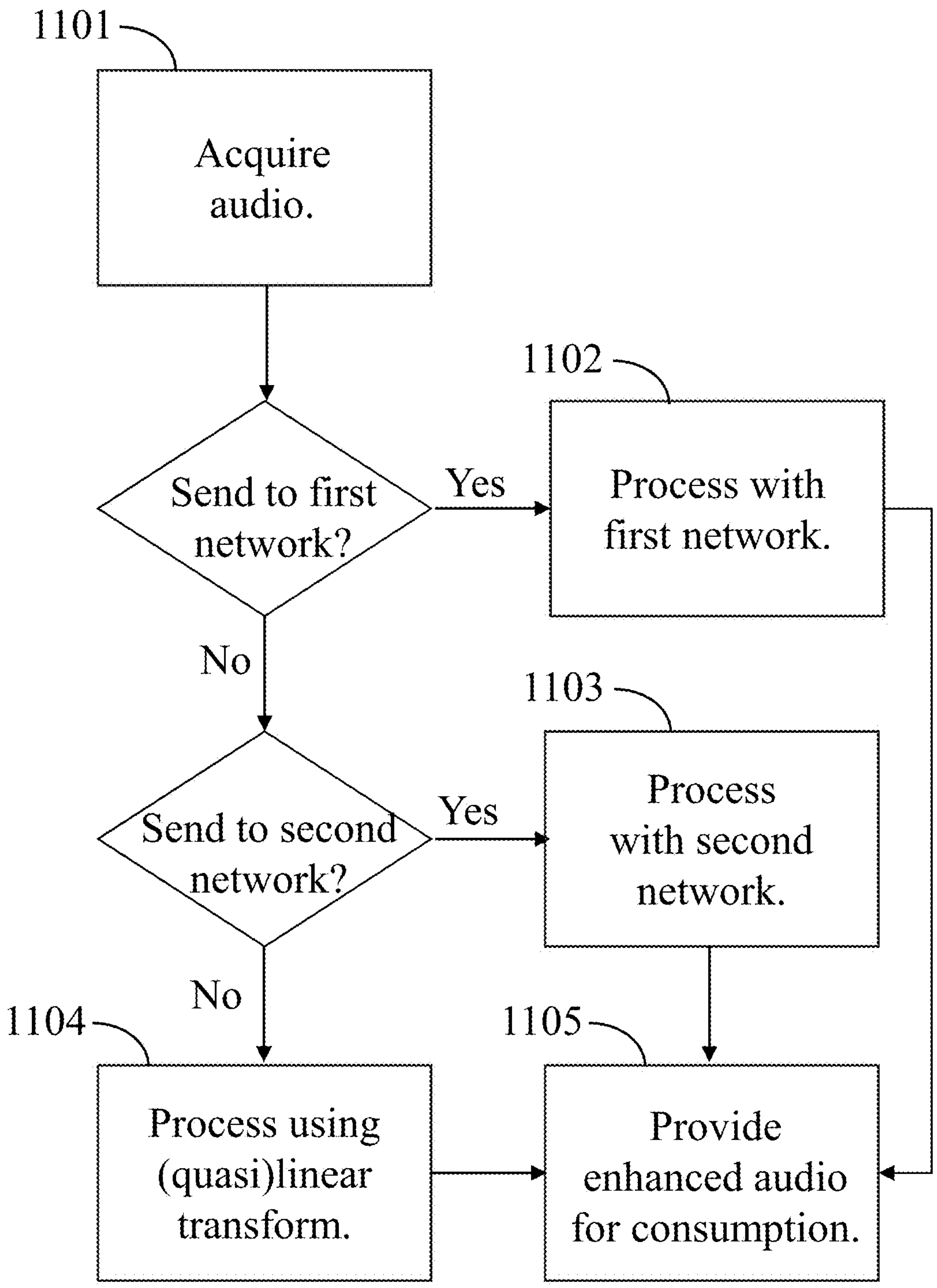
FIG. 11 illustrates a process for using the disclosed technology in support of dynamic mode selection and feedback in a wearable system.

Turning next to FIG. 11, that figure illustrates a process for using the disclosed technology in support of dynamic mode selection and feedback in a wearable system. This may be, for example, a respirator-mounted wearable device which has a limited on-board processor and the ability to offload processing to a local edge box or a cloud system when connectivity and power allow. In this type of example, when an audio signal has been acquired 1101 (e.g., from a contact microphone integrated into a respirator), if the conditions were right, that signal may be sent to, and processed 1102 by, a first neural network which had been trained with contact microphone/studio microphone pairs in the manner described previously in the context of FIG. 5. For example, if the wearable device was configured to communicate with a remote (e.g., cloud based) server over a wireless network connection, then the wearable device may check that transmitting the audio signal would not be an undue drain on its then available battery power, and that network connectivity to the remote server was sufficient for the signal to be transferred and processed without interfering with an intended end use for the audio signal (e.g., that the transfer and processing would not introduce a user-perceptible delay which could interfere with real time audio communication). It is also possible that this type of real time checking may be omitted. For example, if it was known in advance that it would not be feasible to communicate the audio signal to a system which would process it using a neural network trained on contact-microphone/studio microphone pairs (e.g., because no such system was available), then a wearable device may be configured such that it would not attempt to send the audio signal to such a system regardless of the conditions at the time the audio signal was captured.

Continuing with the FIG. 11, if the audio signal was not processed 1102 using the first network, then, if available, the audio signal may be sent to, and processed 1103 by, a second neural network which had been trained to emulate the behavior of the first neural network using a reversed set of parameters (e.g., using a training procedure as described previously in the context of FIG. 6). For example, in a case where there was not access to a remote server running, the first neural network, but the wearable device either had sufficient capacity to run the second neural network itself, or had access to a local computer which had such capacity, the second neural network may be invoked as a backup option for enhancing the audio signal from the throat microphone. Alternatively, if it was not feasible to process the audio signal with either the first or second neural networks, it may be processed 1104 using a (quasi) linear transform+exciter pipeline such as illustrated in FIG. 9. For example, if resources are heavily constrained (e.g., the wearable is operating in a low power mode or available hardware capabilities are degraded) the transform+exciter pipeline may be used as an ultimate fallback for creating an enhanced audio signal. Finally, however it is created, once an enhanced audio signal is available in the process of FIG. 11, that audio signal may be provided 1105 to one or more targets for consumption. These targets may be, for example, an archiving application which would store the enhanced audio for later review and analysis, a streaming application which may distribute the enhanced audio to one or more endpoints designated to receive the audio stream, a speech to text application for creating a transcript of the audio, etc. In this way, the disclosed technology can allow a wearable system to use dynamic mode selection to use the most appropriate approach based on context, with seamless fallbacks (or upgrades, e.g., in the case that network connectivity improves or an external power source becomes available) as that context changes.

Figure 12:
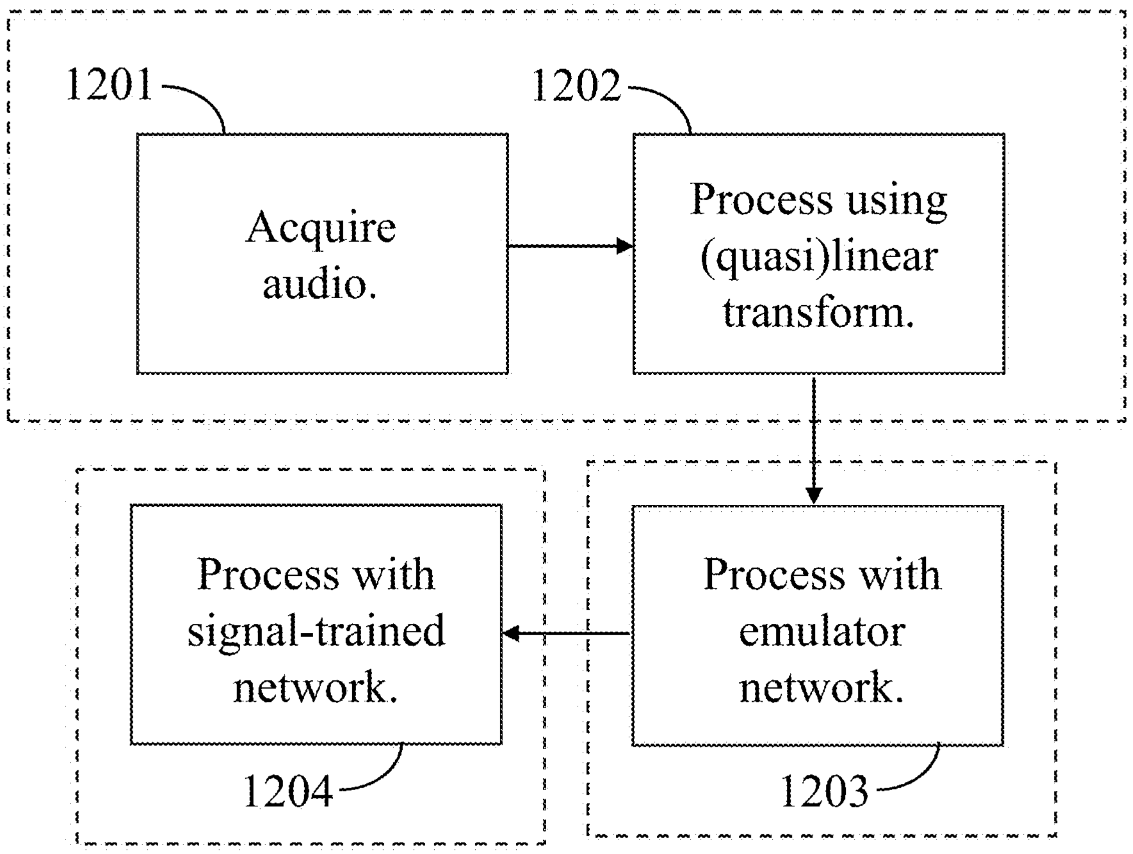
FIG. 12 illustrates a method which could be used for an end to end chain with different processing performed by different system components.

Turning next to FIG. 12, that figure illustrates a method which could be used for an end to end chain with different processing performed by different system components. In the method of FIG. 12, a wearable (e.g., a head-worn, belt-worn or other wearable node) may both acquire 1201 and audio signal and process 1202 it using a linear transform+exciter pipeline such as illustrated in FIG. 9. The processed signal may then be sent over a constrained radio link (e.g., a Bluetooth connection) to a nearby gateway or laptop computer, which could process 1203 it with a neural network which had been trained to emulate the behavior of a neural network which had been trained on paired audio signals (e.g., a neural network following the architecture of table 3 which had been trained as described in FIG. 6). The result of this additional processing may then be provided to a command center or recording system with access to a server operating a neural network which had been trained using signal pairs such as described in the context of FIG. 5. That network could then be used to process 1204 and further enhance the signal, either offline or in near real time for purposes such as archival recordings, AI transcription, or high quality replays. Accordingly, in this method, various approaches described herein can together form a hierarchical enhancement pipeline distributed across a system, thereby enabling a family of cooperating models providing appropriately scaled enhancement at each tier of a resource constrained communication chain.

Further variations and examples are also possible, and could be implemented by those of skill in the art without undue experimentation in light of this disclosure. To illustrate, the following examples are provided of non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A multi-tier signal enhancement system, the system comprising: a) a first neural network; b) a second neural network; c) a filter; d) one or more processors; and e) one or more non-transitory computer readable mediums having stored thereon instructions to, when executed using the one or more processors, select between processing an input signal with the first neural network, the second neural network or the filter based on available resources; wherein, for each signal of a plurality of signals: A) the first neural network is trained to: I) as input, take a representation of that signal as captured by a first sensor in a first magnitude encoding form; and II) as output, provide a representation of that signal as captured by a second sensor in the first magnitude encoding form; B) the second neural network is trained to: I) as input, take a representation of that signal as captured by the first sensor in a second magnitude encoding form; and II) as output, provide an output provided by the first neural network in response to taking that signal as input; and C) the filter is trained to provide an enhanced signal in response to receiving that signal as captured by the first sensor as input.

Example 2

The system of example 1, wherein, for each signal of the plurality of signals: a) the first sensor is a throat microphone; b) the second sensor is a studio microphone; and c) the first magnitude encoding form is a log magnitude short time Fourier (STFT) transform spectrogram.

Example 3

The system of example 2, wherein the second magnitude encoding form is a log magnitude STFT spectrogram which differs from the first magnitude encoding form in one or more of: a) STFT resolution; and/or b) spectral representation compression.

Example 4

The system of example 2, wherein the first neural network comprises three encoder stages, a bottleneck, and skip connections between corresponding encoder and upsampled decoder feature maps.

Example 5

The system of example 1, wherein the filter comprises one or more of: a) a multi-band equalization (EQ) curve; and/or b) a compact finite impulse response (FIR) filter bank.

Example 6

The system of example 1, wherein: a) the system comprises a throat microphone configured to capture the input signal; and b) the instructions stored on the one or more non-transitory computer readable mediums comprise instructions to: i) based on selecting to process the input signal with the first neural network, sending the input signal over a wide area network connection to a server hosting the first neural network; ii) based on selecting to process the input signal with the second neural network, sending the input signal over a local network connection to a computer comprising a memory storing the second neural network; and iii) based on selecting to process the input signal with the filter, apply the filter using a processor located closer to the throat microphone than both: A) the server hosting the first neural network; and B) the computer comprising the memory storing the second neural network.

Example 7

A signal enhancement system comprising: a) a throat microphone, the throat microphone adapted to generate audio signals from vibrations detected while in contact with a neck of a user; b) one or more processors, the one or more processors configured with instructions stored on a non-transitory computer readable medium to perform an enhancement method with an audio signal generated by the throat microphone as an input audio signal for the enhancement method, wherein the enhancement method comprises: i) receiving the input audio signal for the enhancement method; ii) generating an input two dimensional representation based on the input audio signal; iii) obtaining an intermediate two dimensional representation by performing acts comprising processing the input two dimensional representation with a first set of machine learning stages, wherein: A) each machine learning stage from the first set of machine learning stages is configured to take a set of input values having an input cardinality corresponding to that stage, and provide a set of output values having an output cardinality corresponding to that stage; B) the first set of machine learning stages comprises an expansion stage, wherein the input cardinality corresponding to the expansion stage is less than the output cardinality corresponding to that expansion stage; C) for each machine learning stage from the first set of machine learning stages, the set of input values that stage is configured to take and the set of output values that stage is configured to provide each have a resolution, wherein the resolution of the set of input values that stage is configured to take is greater than the set of output values that stage is configured to provide; iv) generating an output two dimensional representation based on the intermediate two dimensional representation by performing acts comprising processing the intermediate two dimensional representation with a second set of machine learning stages, wherein: A) each machine learning stage from the second set of machine learning stages is configured to take a set of input values having an input cardinality corresponding to that stage, and provide a set of output values having an output cardinality corresponding to that stage; and B) for each machine learning stage from the second set of machine learning stages, the input cardinality corresponding to that stage is less than the output cardinality corresponding to that stage; wherein the one or more processors are further configured to generate an output audio signal from the output two dimensional representation, wherein the output audio signal belongs to a structurally different class of signals than the input audio signal in that: I) the output audio signal has a harmonic to noise ratio of greater than 15 decibels, while the input audio signal has a harmonic to noise ratio of less than 15 decibels; II) the output audio signal has a ratio of amplitudes of third and fourth formants to amplitudes of first and second formants which is greater than a ratio of amplitudes of third and fourth formants in the input audio signal to amplitudes of first and second formants in the input audio signal; and III) the output audio signal has a ratio of 2-4 kilohertz band energy to 200-800 hertz band energy which is greater than a ratio of 2-4 kilohertz band energy to 200-800 hertz band energy in the input audio signal.

Example 8

The system of example 7, wherein: a) the system comprises an air microphone, the air microphone adapted to generate audio signals from vibrations detected in air; b) the one or more processors are further configured to perform a set of machine learning model training acts comprising: i) generating a set of signal pairs, wherein each signal pair from the set of signal pairs comprises: A) a throat microphone signal generated by the throat microphone from vibrations of a user vocalization detected while in contact with the neck of the user; and B) an air microphone signal generated from vibrations of the user vocalization detected in air; ii) obtaining a set of losses based on, for each signal pair from the set of signal pairs: A) obtaining an output two dimensional representation for that signal pair by performing the enhancement method with the throat microphone signal from that signal pair as the input audio signal for the enhancement method; B) obtaining a ground truth two dimensional representation for that signal pair based on the air microphone signal from that signal pair; and C) determining a loss for that signal pair based on comparing the output two dimensional representation for that signal pair with the ground truth two dimensional representation for that signal pair; and iii) updating the first set of machine learning stages and the second set of machine learning stages based on the set of losses.

Example 9

The system of example 7, wherein the one or more processors are configured to perform a reduced enhancement method with the audio signal generated by the throat microphone as an input audio signal for the reduced enhancement method, wherein the reduced enhancement method comprises: a) receiving the input audio signal for the reduced enhancement method; b) generating an input two dimensional representation for the reduced enhancement method based on the input audio signal for the reduced enhancement method; c) obtaining an intermediate two dimensional representation for the reduced enhancement method by performing acts comprising processing the input two dimensional representation for the reduced enhancement method with a third set of machine learning stages, wherein: i) each machine learning stage from the third set of machine learning stages is configured to take a set of input values having an input cardinality corresponding to that stage, and provide a set of output values having an output cardinality corresponding to that stage; ii) the third set of machine learning stages comprises a second expansion stage, wherein the input cardinality corresponding to the second expansion stage is less than the output cardinality corresponding to that expansion stage; iii) for each machine learning stage from the third set of machine learning stages, the set of input values that stage is configured to take and the set of output values that stage is configured to provide each have a resolution, wherein the resolution of the set of input values that stage is configured to take is greater than the set of output values that stage is configured to provide; and iv) the cardinality of the first set of machine learning stages is greater than the cardinality of the third set of machine learning stages; d) generating an output two dimensional representation for the reduced enhancement method based on the intermediate two dimensional representation for the reduced enhancement method by performing acts comprising processing the intermediate two dimensional representation for the reduced enhancement method with a fourth set of machine learning stages, wherein: i) each machine learning stage from the fourth set of machine learning stages is configured to take a set of input values having an input cardinality corresponding to that stage, and provide a set of output values having an output cardinality corresponding to that stage; ii) for each machine learning stage from the fourth set of machine learning stages, the input cardinality corresponding to that stage is less than the output cardinality corresponding to that stage; and iii) the cardinality of the second set of machine learning stages is greater than the cardinality of the fourth set of machine learning stages.

Example 10

The system of example 9, wherein the one or more processors are configured to perform a set of machine learning model teaching acts comprising: a) performing the reduced enhancement method with the audio signal generated by the throat microphone as the input audio signal for the reduced enhancement method; b) determining a loss based on comparing the output two dimensional representation for the reduced enhancement method with the output two dimensional representation generated in performing the enhancement method with the audio signal generated by the throat microphone as the input audio signal for the enhancement method; and c) updating the third set of machine learning stages and the fourth set of machine learning stages based on the loss.

Example 11

The system of example 9, wherein the input two dimensional representation for the reduced enhancement method has a lower resolution than the two dimensional representation generated in the enhancement method.

Example 12

The system of example 9, wherein the one or more processers comprises: a) at least one processor configured to improve the audio signal generated by the throat microphone using the enhancement method; b) at least one processor configured to improve the audio signal generated by the throat microphone using the reduced enhancement method; and c) at least one processor configured to improve the audio signal generated by the throat microphone based on applying one or more of: i) a multi-band EQ curve; ii) a compact FIR filter bank; and iii) a spectral gain function.

Example 13

The system of example 7, wherein: a) an architecture ratio for the first set of machine learning stages is at least two, wherein the architecture ratio for the first set of machine learning stages is defined as a ratio of:i) the output cardinality of a last stage from the first set of machine learning stages divided by the resolution of the set of output values the last stage from the first set of machine learning stages is configured to provided; to ii) the output cardinality of the last stage from the first set of machine learning stages divided by the input cardinality of an initial stage from the first set of machine learning stages; b) the first set of machine learning stages has a cardinality greater than or equal to the architecture ratio; c) obtaining the intermediate two dimensional representation comprises providing the set of output values provided by the last stage from the first set of machine learning stages to a second expansion stage, wherein the second expansion stage is configured to take a set of input values having an input cardinality and to provide a set of output values having an output cardinality equal to twice the input cardinality; and d) for each machine learning stage from the second set of machine learning stages: i) that stage has a corresponding stage in the first set of machine learning stages; ii) that stage comprises a first machine learning block and a second machine learning block; iii) that stage is configured to process the set of input values it is configured to take by: A) obtaining a set of stage intermediate values by providing the set of input values to the first machine learning block; and B) providing the set of stage intermediate values and the set of output values that stage's corresponding stage in the first set of machine learning stages is configured to provide.

Example 14

A method comprising: a) performing an enhancement method with an audio signal generated by a throat microphone as an input audio signal for the enhancement method, the enhancement method comprising: i) receiving the input audio signal for the enhancement method; ii) generating an input two dimensional representation based on the input audio signal; iii) obtaining an intermediate two dimensional representation by performing acts comprising processing the input two dimensional representation with a first set of machine learning stages, wherein: A) each machine learning stage from the first set of machine learning stages is configured to take a set of input values having an input cardinality corresponding to that stage, and provide a set of output values having an output cardinality corresponding to that stage; B) the first set of machine learning stages comprises an expansion stage, wherein the input cardinality corresponding to the expansion stage is less than the output cardinality corresponding to that expansion stage; C) for each machine learning stage from the first set of machine learning stages, the set of input values that stage is configured to take and the set of output values that stage is configured to provide each have a resolution, wherein the resolution of the set of input values that stage is configured to take is greater than the set of output values that stage is configured to provide; iv) generating an output two dimensional representation based on the intermediate two dimensional representation by performing acts comprising processing the intermediate two dimensional representation with a second set of machine learning stages, wherein: A) each machine learning stage from the second set of machine learning stages is configured to take a set of input values having an input cardinality corresponding to that stage, and provide a set of output values having an output cardinality corresponding to that stage; and B) for each machine learning stage from the second set of machine learning stages, the input cardinality corresponding to that stage is less than the output cardinality corresponding to that stage; and b) generating an output audio signal from the output two dimensional representation, wherein the output audio signal belongs to a structurally different class of signals than the input audio signal in that: i) the output audio signal has a harmonic to noise ratio of greater than 15 decibels, while the input audio signal has a harmonic to noise ratio of less than 15 decibels; ii) the output audio signal has a ratio of amplitudes of third and fourth formants to amplitudes of first and second formants which is greater than a ratio of amplitudes of third and fourth formants in the input audio signal to amplitudes of first and second formants in the input audio signal; and iii) the output audio signal has a ratio of 2-4 kilohertz band energy to 200-800 hertz band energy which is greater than a ratio of 2-4 kilohertz band energy to 200-800 hertz band energy in the input audio signal.

Example 15

The method of example 14, wherein the method comprises performing a set of machine learning model training acts comprising: a) generating a set of signal pairs, wherein each signal pair from the set of signal pairs comprises: i) a throat microphone signal generated by the throat microphone from vibrations of a user vocalization detected while in contact with the neck of a user; and ii) an air microphone signal generated from vibrations of the user vocalization detected in air; b) obtaining a set of losses based on, for each signal pair from the set of signal pairs: i) obtaining an output two dimensional representation for that signal pair by performing the enhancement method with the throat microphone signal from that signal pair as the input audio signal for the enhancement method; ii) obtaining a ground truth two dimensional representation for that signal pair based on the air microphone signal from that signal pair; and iii) determining a loss for that signal pair based on comparing the output two dimensional representation for that signal pair with the ground truth two dimensional representation for that signal pair; and c) updating the first set of machine learning stages and the second set of machine learning stages based on the set of losses.

Example 16

The method of example 14, wherein the method further comprises performing a reduced enhancement method with the audio signal generated by the throat microphone as an input audio signal for the reduced enhancement method, wherein the reduced enhancement method comprises: a) receiving the input audio signal for the reduced enhancement method; b) generating an input two dimensional representation for the reduced enhancement method based on the input audio signal for the reduced enhancement method; c) obtaining an intermediate two dimensional representation for the reduced enhancement method by performing acts comprising processing the input two dimensional representation for the reduced enhancement method with a third set of machine learning stages, wherein: i) each machine learning stage from the third set of machine learning stages is configured to take a set of input values having an input cardinality corresponding to that stage, and provide a set of output values having an output cardinality corresponding to that stage; ii) the third set of machine learning stages comprises a second expansion stage, wherein the input cardinality corresponding to the second expansion stage is less than the output cardinality corresponding to that expansion stage; iii) for each machine learning stage from the third set of machine learning stages, the set of input values that stage is configured to take and the set of output values that stage is configured to provide each have a resolution, wherein the resolution of the set of input values that stage is configured to take is greater than the set of output values that stage is configured to provide; and iv) the cardinality of the first set of machine learning stages is greater than the cardinality of the third set of machine learning stages; d) generating an output two dimensional representation for the reduced enhancement method based on the intermediate two dimensional representation for the reduced enhancement method by performing acts comprising processing the intermediate two dimensional representation for the reduced enhancement method with a fourth set of machine learning stages, wherein: i) each machine learning stage from the fourth set of machine learning stages is configured to take a set of input values having an input cardinality corresponding to that stage, and provide a set of output values having an output cardinality corresponding to that stage; ii) for each machine learning stage from the fourth set of machine learning stages, the input cardinality corresponding to that stage is less than the output cardinality corresponding to that stage; and iii) the cardinality of the second set of machine learning stages is greater than the cardinality of the fourth set of machine learning stages.

Example 17

The method of example 16, wherein the method comprises performing a machine learning teaching method comprising: a) performing the reduced enhancement method with the audio signal generated by the throat microphone as the input audio signal for the reduced enhancement method; b) determining a loss based on comparing the output two dimensional representation for the reduced enhancement method with the output two dimensional representation generated in performing the enhancement method with the audio signal generated by the throat microphone as the input audio signal for the enhancement method; and c) updating the third set of machine learning stages and the fourth set of machine learning stages based on the loss.

Example 18

The method of example 16, wherein the input two dimensional representation for the reduced enhancement method has a lower resolution than the two dimensional representation generated in the enhancement method.

Example 19

The method of example 16, wherein the method comprises: a) using a first set of processors to improve the audio signal generated by the throat microphone using the enhancement method; b) using a second set of processors to improve the audio signal generated by the throat microphone using the reduced enhancement method; and c) using a third set of processors to improve the audio signal generated by the throat microphone based on applying one or more of: i) a multi-band EQ curve; ii) a compact FIR filter bank; and iii) a spectral gain function.

Example 20

The method of example 14, wherein: a) an architecture ratio for the first set of machine learning stages is at least two, wherein the architecture ratio for the first set of machine learning stages is defined as a ratio of:i) the output cardinality of a last stage from the first set of machine learning stages divided by the resolution of the set of output values the last stage from the first set of machine learning stages is configured to provided; to ii) the output cardinality of the last stage from the first set of machine learning stages divided by the input cardinality of an initial stage from the first set of machine learning stages; b) the first set of machine learning stages has a cardinality greater than or equal to the architecture ratio; c) obtaining the intermediate two dimensional representation comprises providing the set of output values provided by the last stage from the first set of machine learning stages to a second expansion stage, wherein the second expansion stage is configured to take a set of input values having an input cardinality and to provide a set of output values having an output cardinality equal to twice the input cardinality; and d) for each machine learning stage from the second set of machine learning stages: i) that stage has a corresponding stage in the first set of machine learning stages; ii) that stage comprises a first machine learning block and a second machine learning block; iii) that stage is configured to process the set of input values it is configured to take by: A) obtaining a set of stage intermediate values by providing the set of input values to the first machine learning block; and B) providing the set of stage intermediate values and the set of output values that stage's corresponding stage in the first set of machine learning stages is configured to provide.

Each of the calculations or operations described herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described above. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like.

All patents, patent publications, patent applications, journal articles, books, technical references, and the like discussed in the instant disclosure are incorporated herein by reference in their entirety for all purposes.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. In certain cases, method steps or operations may be performed or executed in differing order, or operations may be added, deleted or modified. It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention. Accordingly, the claims should not be treated as limited to the examples, drawings, embodiments and illustrations provided above, but instead should be understood as having the scope provided when their terms are given their broadest reasonable interpretation as provided by a general purpose dictionary, except that when a term or phrase is indicated as having a particular meaning under the heading Explicit Definitions, it should be understood as having that meaning when used in the claims.

Explicit Definitions

It should be understood that, in the above examples and the claims, a statement that something is "based on" something else should be understood to mean that it is determined at least in part by the thing that it is indicated as being based on. To indicate that something must be completely determined based on something else, it is described as being "based EXCLUSIVELY on" whatever it must be completely determined by.

It should be understood that, in the above examples and claims, modifiers "first," "second," etc. are used solely to facilitate identification of aspects recited in the examples or claims, and are not intended to indicate that particular acts or elements must take place in particular order, or have any other sequential, ordinal or other relationship to each other.

It should be understood that, in the above examples and claims, the term "set" should be understood as one or more things which are grouped together.

What is claimed is:

1. A signal enhancement system comprising:

a) a throat microphone, the throat microphone adapted to generate audio signals from vibrations detected while in contact with a neck of a user;

b) one or more processors, the one or more processors configured with instructions stored on a non-transitory computer readable medium to perform an enhancement method with an audio signal generated by the throat microphone as an input audio signal for the enhancement method, wherein the enhancement method comprises:

i) receiving the input audio signal for the enhancement method;

ii) generating an input two dimensional representation based on the input audio signal;

iii) obtaining an intermediate two dimensional representation by performing acts comprising processing the input two dimensional representation with a first set of machine learning stages, wherein:

A) each machine learning stage from the first set of machine learning stages is configured to take a set of input values having an input cardinality corresponding to that stage, and provide a set of output values having an output cardinality corresponding to that stage;

B) the first set of machine learning stages comprises an expansion stage, wherein the input cardinality corresponding to the expansion stage is less than the output cardinality corresponding to that expansion stage;

C) for each machine learning stage from the first set of machine learning stages, the set of input values that stage is configured to take and the set of output values that stage is configured to provide each have a resolution, wherein the resolution of the set of input values that stage is configured to take is greater than the set of output values that stage is configured to provide;

iv) generating an output two dimensional representation based on the intermediate two dimensional representation by performing acts comprising processing the intermediate two dimensional representation with a second set of machine learning stages, wherein:

A) each machine learning stage from the second set of machine learning stages is configured to take a set of input values having an input cardinality corresponding to that stage, and provide a set of output values having an output cardinality corresponding to that stage; and B) for each machine learning stage from the second set of machine learning stages, the input cardinality corresponding to that stage is less than the output cardinality corresponding to that stage;

wherein the one or more processors are further configured to generate an output audio signal from the output two dimensional representation, wherein the output audio signal belongs to a structurally different class of signals than the input audio signal in that:

I) the output audio signal has a harmonic to noise ratio of greater than 15 decibels, while the input audio signal has a harmonic to noise ratio of less than 15 decibels;

II) the output audio signal has a ratio of amplitudes of third and fourth formants to amplitudes of first and second formants which is greater than a ratio of amplitudes of third and fourth formants in the input audio signal to amplitudes of first and second formants in the input audio signal; and III) the output audio signal has a ratio of 2-4 kilohertz band energy to 200-800 hertz band energy which is greater than a ratio of 2-4 kilohertz band energy to 200-800 hertz band energy in the input audio signal.

2. The system of claim 1, wherein:

a) the system comprises an air microphone, the air microphone adapted to generate audio signals from vibrations detected in air;

b) the one or more processors are further configured to perform a set of machine learning model training acts comprising:

i) generating a set of signal pairs, wherein each signal pair from the set of signal pairs comprises:

A) a throat microphone signal generated by the throat microphone from vibrations of a user vocalization detected while in contact with the neck of the user; and B) an air microphone signal generated from vibrations of the user vocalization detected in air;

ii) obtaining a set of losses based on, for each signal pair from the set of signal pairs:

A) obtaining an output two dimensional representation for that signal pair by performing the enhancement method with the throat microphone signal from that signal pair as the input audio signal for the enhancement method;

B) obtaining a ground truth two dimensional representation for that signal pair based on the air microphone signal from that signal pair; and C) determining a loss for that signal pair based on comparing the output two dimensional representation for that signal pair with the ground truth two dimensional representation for that signal pair;

and iii) updating the first set of machine learning stages and the second set of machine learning stages based on the set of losses.

3. The system of claim 1, wherein the one or more processors are configured to perform a reduced enhancement method with the audio signal generated by the throat microphone as an input audio signal for the reduced enhancement method, wherein the reduced enhancement method comprises:

a) receiving the input audio signal for the reduced enhancement method;

b) generating an input two dimensional representation for the reduced enhancement method based on the input audio signal for the reduced enhancement method;

c) obtaining an intermediate two dimensional representation for the reduced enhancement method by performing acts comprising processing the input two dimensional representation for the reduced enhancement method with a third set of machine learning stages, wherein:

i) each machine learning stage from the third set of machine learning stages is configured to take a set of input values having an input cardinality corresponding to that stage, and provide a set of output values having an output cardinality corresponding to that stage;

ii) the third set of machine learning stages comprises a second expansion stage, wherein the input cardinality corresponding to the second expansion stage is less than the output cardinality corresponding to that expansion stage;

iii) for each machine learning stage from the third set of machine learning stages, the set of input values that stage is configured to take and the set of output values that stage is configured to provide each have a resolution, wherein the resolution of the set of input values that stage is configured to take is greater than the set of output values that stage is configured to provide; and iv) the cardinality of the first set of machine learning stages is greater than the cardinality of the third set of machine learning stages;

d) generating an output two dimensional representation for the reduced enhancement method based on the intermediate two dimensional representation for the reduced enhancement method by performing acts comprising processing the intermediate two dimensional representation for the reduced enhancement method with a fourth set of machine learning stages, wherein:

i) each machine learning stage from the fourth set of machine learning stages is configured to take a set of input values having an input cardinality corresponding to that stage, and provide a set of output values having an output cardinality corresponding to that stage;

ii) for each machine learning stage from the fourth set of machine learning stages, the input cardinality corresponding to that stage is less than the output cardinality corresponding to that stage; and iii) the cardinality of the second set of machine learning stages is greater than the cardinality of the fourth set of machine learning stages.

4. The system of claim 3, wherein the one or more processors are configured to perform a set of machine learning model teaching acts comprising:

a) performing the reduced enhancement method with the audio signal generated by the throat microphone as the input audio signal for the reduced enhancement method;

b) determining a loss based on comparing the output two dimensional representation for the reduced enhancement method with the output two dimensional representation generated in performing the enhancement method with the audio signal generated by the throat microphone as the input audio signal for the enhancement method; and c) updating the third set of machine learning stages and the fourth set of machine learning stages based on the loss.

5. The system of claim 3, wherein the input two dimensional representation for the reduced enhancement method has a lower resolution than the two dimensional representation generated in the enhancement method.

6. The system of claim 3, wherein the one or more processers comprises:

a) at least one processor configured to improve the audio signal generated by the throat microphone using the enhancement method;

b) at least one processor configured to improve the audio signal generated by the throat microphone using the reduced enhancement method; and c) at least one processor configured to improve the audio signal generated by the throat microphone based on applying one or more of:

i) a multi-band EQ curve;

ii) a compact FIR filter bank; and iii) a spectral gain function.

7. The system of claim 1, wherein:

a) an architecture ratio for the first set of machine learning stages is at least two, wherein the architecture ratio for the first set of machine learning stages is defined as a ratio of:

i) the output cardinality of a last stage from the first set of machine learning stages divided by the resolution of the set of output values the last stage from the first set of machine learning stages is configured to provided; to ii) the output cardinality of the last stage from the first set of machine learning stages divided by the input cardinality of an initial stage from the first set of machine learning stages;

b) the first set of machine learning stages has a cardinality greater than or equal to the architecture ratio;

c) obtaining the intermediate two dimensional representation comprises providing the set of output values provided by the last stage from the first set of machine learning stages to a second expansion stage, wherein the second expansion stage is configured to take a set of input values having an input cardinality and to provide a set of output values having an output cardinality equal to twice the input cardinality; and d) for each machine learning stage from the second set of machine learning stages:

i) that stage has a corresponding stage in the first set of machine learning stages;

ii) that stage comprises a first machine learning block and a second machine learning block;

iii) that stage is configured to process the set of input values it is configured to take by:

A) obtaining a set of stage intermediate values by providing the set of input values to the first machine learning block; and B) providing the set of stage intermediate values and the set of output values that stage's corresponding stage in the first set of machine learning stages is configured to provide.

8. A method comprising:

a) performing an enhancement method with an audio signal generated by a throat microphone as an input audio signal for the enhancement method, the enhancement method comprising:

i) receiving the input audio signal for the enhancement method;

ii) generating an input two dimensional representation based on the input audio signal;

iii) obtaining an intermediate two dimensional representation by performing acts comprising processing the input two dimensional representation with a first set of machine learning stages, wherein:

A) each machine learning stage from the first set of machine learning stages is configured to take a set of input values having an input cardinality corresponding to that stage, and provide a set of output values having an output cardinality corresponding to that stage;

B) the first set of machine learning stages comprises an expansion stage, wherein the input cardinality corresponding to the expansion stage is less than the output cardinality corresponding to that expansion stage;

C) for each machine learning stage from the first set of machine learning stages, the set of input values that stage is configured to take and the set of output values that stage is configured to provide each have a resolution, wherein the resolution of the set of input values that stage is configured to take is greater than the set of output values that stage is configured to provide;

iv) generating an output two dimensional representation based on the intermediate two dimensional representation by performing acts comprising processing the intermediate two dimensional representation with a second set of machine learning stages, wherein:

A) each machine learning stage from the second set of machine learning stages is configured to take a set of input values having an input cardinality corresponding to that stage, and provide a set of output values having an output cardinality corresponding to that stage; and B) for each machine learning stage from the second set of machine learning stages, the input cardinality corresponding to that stage is less than the output cardinality corresponding to that stage;

and b) generating an output audio signal from the output two dimensional representation, wherein the output audio signal belongs to a structurally different class of signals than the input audio signal in that:

i) the output audio signal has a harmonic to noise ratio of greater than 15 decibels, while the input audio signal has a harmonic to noise ratio of less than 15 decibels;

ii) the output audio signal has a ratio of amplitudes of third and fourth formants to amplitudes of first and second formants which is greater than a ratio of amplitudes of third and fourth formants in the input audio signal to amplitudes of first and second formants in the input audio signal; and iii) the output audio signal has a ratio of 2-4 kilohertz band energy to 200-800 hertz band energy which is greater than a ratio of 2-4 kilohertz band energy to 200-800 hertz band energy in the input audio signal.

9. The method of claim 8, wherein the method comprises performing a set of machine learning model training acts comprising:

a) generating a set of signal pairs, wherein each signal pair from the set of signal pairs comprises:

i) a throat microphone signal generated by the throat microphone from vibrations of a user vocalization detected while in contact with the neck of a user; and ii) an air microphone signal generated from vibrations of the user vocalization detected in air;

b) obtaining a set of losses based on, for each signal pair from the set of signal pairs:

i) obtaining an output two dimensional representation for that signal pair by performing the enhancement method with the throat microphone signal from that signal pair as the input audio signal for the enhancement method;

ii) obtaining a ground truth two dimensional representation for that signal pair based on the air microphone signal from that signal pair; and iii) determining a loss for that signal pair based on comparing the output two dimensional representation for that signal pair with the ground truth two dimensional representation for that signal pair; and c) updating the first set of machine learning stages and the second set of machine learning stages based on the set of losses.

10. The method of claim 8, wherein the method further comprises performing a reduced enhancement method with the audio signal generated by the throat microphone as an input audio signal for the reduced enhancement method, wherein the reduced enhancement method comprises:

a) receiving the input audio signal for the reduced enhancement method;

b) generating an input two dimensional representation for the reduced enhancement method based on the input audio signal for the reduced enhancement method;

c) obtaining an intermediate two dimensional representation for the reduced enhancement method by performing acts comprising processing the input two dimensional representation for the reduced enhancement method with a third set of machine learning stages, wherein:

i) each machine learning stage from the third set of machine learning stages is configured to take a set of input values having an input cardinality corresponding to that stage, and provide a set of output values having an output cardinality corresponding to that stage;

ii) the third set of machine learning stages comprises a second expansion stage, wherein the input cardinality corresponding to the second expansion stage is less than the output cardinality corresponding to that expansion stage;

iii) for each machine learning stage from the third set of machine learning stages, the set of input values that stage is configured to take and the set of output values that stage is configured to provide each have a resolution, wherein the resolution of the set of input values that stage is configured to take is greater than the set of output values that stage is configured to provide; and iv) the cardinality of the first set of machine learning stages is greater than the cardinality of the third set of machine learning stages;

d) generating an output two dimensional representation for the reduced enhancement method based on the intermediate two dimensional representation for the reduced enhancement method by performing acts comprising processing the intermediate two dimensional representation for the reduced enhancement method with a fourth set of machine learning stages, wherein:

i) each machine learning stage from the fourth set of machine learning stages is configured to take a set of input values having an input cardinality corresponding to that stage, and provide a set of output values having an output cardinality corresponding to that stage;

ii) for each machine learning stage from the fourth set of machine learning stages, the input cardinality corresponding to that stage is less than the output cardinality corresponding to that stage; and iii) the cardinality of the second set of machine learning stages is greater than the cardinality of the fourth set of machine learning stages.

11. The method of claim 10, wherein the method comprises performing a machine learning teaching method comprising:

a) performing the reduced enhancement method with the audio signal generated by the throat microphone as the input audio signal for the reduced enhancement method;

b) determining a loss based on comparing the output two dimensional representation for the reduced enhancement method with the output two dimensional representation generated in performing the enhancement method with the audio signal generated by the throat microphone as the input audio signal for the enhancement method; and c) updating the third set of machine learning stages and the fourth set of machine learning stages based on the loss.

12. The method of claim 10, wherein the input two dimensional representation for the reduced enhancement method has a lower resolution than the two dimensional representation generated in the enhancement method.

13. The method of claim 10, wherein the method comprises:

a) using a first set of processors to improve the audio signal generated by the throat microphone using the enhancement method;

b) using a second set of processors to improve the audio signal generated by the throat microphone using the reduced enhancement method; and c) using a third set of processors to improve the audio signal generated by the throat microphone based on applying one or more of:

i) a multi-band EQ curve;

ii) a compact FIR filter bank; and iii) a spectral gain function.

14. The method of claim 8, wherein:

a) an architecture ratio for the first set of machine learning stages is at least two, wherein the architecture ratio for the first set of machine learning stages is defined as a ratio of:

i) the output cardinality of a last stage from the first set of machine learning stages divided by the resolution of the set of output values the last stage from the first set of machine learning stages is configured to provided; to ii) the output cardinality of the last stage from the first set of machine learning stages divided by the input cardinality of an initial stage from the first set of machine learning stages;

b) the first set of machine learning stages has a cardinality greater than or equal to the architecture ratio;

c) obtaining the intermediate two dimensional representation comprises providing the set of output values provided by the last stage from the first set of machine learning stages to a second expansion stage, wherein the second expansion stage is configured to take a set of input values having an input cardinality and to provide a set of output values having an output cardinality equal to twice the input cardinality; and d) for each machine learning stage from the second set of machine learning stages:

i) that stage has a corresponding stage in the first set of machine learning stages;

ii) that stage comprises a first machine learning block and a second machine learning block;

iii) that stage is configured to process the set of input values it is configured to take by:

A) obtaining a set of stage intermediate values by providing the set of input values to the first machine learning block; and B) providing the set of stage intermediate values and the set of output values that stage's corresponding stage in the first set of machine learning stages is configured to provide.

* * * * *